(12) United States Patent
Lee et al.

(10) Patent No.: US 11,352,728 B2
(45) Date of Patent: Jun. 7, 2022

(54) WASHING MACHINE AND METHOD OF CONTROLLING THE SAME

(71) Applicant: Samsung Electronics Co., Ltd, Suwon-si (KR)

(72) Inventors: Seung Hun Lee, Suwon-si (KR); Jun Hyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 16/699,434

(22) Filed: Nov. 29, 2019

(65) Prior Publication Data

US 2020/0173086 A1 Jun. 4, 2020

(30) Foreign Application Priority Data

Nov. 30, 2018 (KR) .................. 10-2018-0151851

(51) Int. Cl.
| | |
|---|---|
| *D06F 33/00* | (2020.01) |
| *D06F 37/30* | (2020.01) |
| *D06F 37/36* | (2006.01) |
| *D06F 37/40* | (2006.01) |
| *H02M 1/42* | (2007.01) |
| *H02P 1/46* | (2006.01) |
| *H02P 6/08* | (2016.01) |
| *D06F 105/48* | (2020.01) |

(52) U.S. Cl.
CPC ............ *D06F 33/00* (2013.01); *D06F 37/304* (2013.01); *D06F 37/36* (2013.01); *D06F 37/40* (2013.01); *H02M 1/4208* (2013.01); *H02P 1/46* (2013.01); *H02P 6/08* (2013.01); *D06F 2105/48* (2020.02); *H02M 1/4283* (2021.05)

(58) Field of Classification Search
CPC ...................................................... D06F 33/00
See application file for complete search history.

(56) References Cited

U.S. PATENT DOCUMENTS

| | | | |
|---|---|---|---|
| 2017/0167067 A1 | 6/2017 | Lee et al. | |
| 2018/0313014 A1 | 11/2018 | Kim | |

FOREIGN PATENT DOCUMENTS

| | | | |
|---|---|---|---|
| EP | 3301215 A1 | 4/2018 |
| JP | H10-137484 A | 5/1998 |
| JP | 5896273 B2 | 3/2016 |
| JP | 6071032 B2 | 2/2017 |
| KR | 10-2002-0073064 A | 9/2002 |

OTHER PUBLICATIONS

European Search Report dated Mar. 23, 2020 in connection with European Patent Application No. 19 21 2629, 9 pages.
European Patent Office, "Communication pursuant to Article 94(3) EPC", dated Feb. 5, 2021, in connection with European Patent Application No. 19212629.0, 4 pages.

*Primary Examiner* — Jason Y Ko

(57) ABSTRACT

A washing machine including a rotating tub and a motor applying a driving force to the rotating tub. The washing machine configured to generate a starting current to be applied to the motor when it is a start time of the motor, accelerate the speed of the motor stepwise while the starting current is applied to the motor, check a current of a torque component when it is determined as a deceleration time or a stop time, and apply a current of a magnetic flux component greater than the magnitude of the current of the checked torque component to the motor.

11 Claims, 16 Drawing Sheets

WASHING MACHINE AND METHOD OF CONTROLLING THE SAME

CROSS-REFERENCE TO RELATED APPLICATION

This application is based on and claims priority under 35 U.S.C. § 119 to Korean Patent Application No. 10-2018-0151851 filed on Nov. 30, 2018 in the Korean Intellectual Property Office, the disclosure of which is incorporated by reference herein in its entirety.

BACKGROUND

1. Field

Embodiments of the disclosure relate to a washing machine and a method of controlling the same to control the starting, deceleration and stopping of a motor that transmits a rotational force to a rotating tub.

2. Description of Related Art

A washing machine is a device for washing, rinsing and dehydrating laundry or drying laundry by rotating a cylindrical rotating tub containing laundry.

The washing machine includes a front loading washing machine in which a rotating tub is arranged horizontally and a laundry inlet is formed in front of the washing machine, and a top loading washing machine in which a rotating tub is vertically arranged and an upper laundry inlet is formed. That is, the washing machine adopts one of the two methods described above to wash the laundry.

Such a washing machine rotates the rotating tub by using a motor and controls the speed of the rotating tub by controlling the speed of the motor when the rotating tub is rotated. When the washing machine controls the speed of the motor, the washing machine detects the speed of the motor and controls the speed of the motor based on the detected speed and the target speed.

The motor of the washing machine includes a sensor-type motor provided with a position sensor for detecting the position of a rotor of the motor, and a sensorless type motor without a position sensor.

Here, the washing machine having the sensorless motor may perform an alignment forcing the rotor of the motor to be aligned in order to control the starting of the motor, and then accelerate the motor to start the motor. In controlling the motor's deceleration or stop, the motor is decelerated or stopped by reducing the target speed of the motor.

SUMMARY

One aspect provides a washing machine and a method of controlling the same that controls the starting of a motor by accelerating the speed of the motor stepwise when the motor is not aligned.

Another aspect provides a washing machine and a method of controlling the same to apply a current of a magnetic flux component (d-axis current) greater than a torque component current (q-axis current) applied to a motor during deceleration control of a rotating tub.

In accordance with an aspect of the disclosure, a washing machine may include a rotating tub; a motor configured to apply a driving force to the rotating tub and be provided in a sensorless type; a controller, when starting by not performing alignment of the motor, configured to control generation of a starting current to be applied to the motor, and control the speed of the motor stepwise while the starting current is applied to the motor; and a driver configured to generate a current for driving the motor in respond to a control command of the controller and apply the generated current to the motor.

The controller, when controlling the speed of the motor stepwise, may control a synchronous acceleration of the speed of the motor at a first speed, and control the synchronous acceleration of the speed of the motor at a second speed, which is faster than the first speed when the motor speed is in the first speed.

The controller may control the motor to rotate at a higher rotation then the motor is accelerated during the synchronous acceleration in the second speed than when the motor is accelerated during the synchronous acceleration in the first speed.

The washing machine may further include a pulsator configured to be rotatably provided in the rotating tub; and a clutch configured to transmit the driving force of the motor to at least one of the pulsator and the rotating tub, and the controller may accelerate the speed of the motor stepwise to start the motor when the driving force of the motor is transmitted to the rotating tub by the clutch.

The washing machine may further include a dehydration shaft configured to be connected to the rotating tub; and a bearing configured to be provided in the clutch and guide the dehydration shaft such that rotating in one direction, and the controller may accelerate the speed of the motor stepwise at the rotation timepoint of the rotating tub to start the motor.

The washing machine may further include a driving shaft configured to be connected to the motor; a washing shaft configured to be connected to the pulsator; a boss configured to be provided in the clutch and be coupled to the driving shaft; and a coupling configured to be provided in the clutch and be selectively coupled to the boss and the washing shaft, and the coupling may couple to boss teeth with a gap having a first predetermined size and may couple to dehydration teeth provided in a dehydration shaft with a gap having a second predetermined size at a time of rotation of the rotating tub.

The driver may include a rectifier configured to rectify AC power inputted from a power supply; a smoother configured to smooth the power transmitted from the rectifier and convert the power into constant size DC power; and an inverter configured to convert the transmitted DC power from the smoother into 3-phase AC power.

The controller may determine whether it is time to decelerate when performing any of the following operations: washing stroke, rinsing stroke, dehydration stroke and drying stroke, and when it is determined as a deceleration time point, may check a current of a torque component to prevent a rise of DC voltage of the smoother, and may control to apply a current of a magnetic flux component greater than the magnitude of the current of the checked torque component to the motor.

The controller may determine whether it is time to stop when performing any of the following operations: washing stroke, rinsing stroke, dehydration stroke and drying stroke, and when it is determined as a stop time point, may check a current of a torque component to prevent a rise of DC voltage of the smoother, and may control to apply a current of the magnetic flux component greater than the magnitude of the current of the checked torque component to the motor.

The washing machine may further include an input, and the controller may check a current of a torque component to prevent a rise of DC voltage of the smoother when a stop command is received from the input, and may control to apply a current of a magnetic flux component greater than the magnitude of the current of the checked torque component to the motor.

The controller may determine whether the motor stops, and when it is determined that the motor is stopped, the speed of the motor is checked, and when the speed of the motor is higher than a reference speed, checks a current of a torque component to prevent a rise of DC voltage of the smoother, and controls a current of a magnetic flux component greater than the magnitude of the current of the checked torque component to be applied to the motor.

In accordance with another aspect of the disclosure, a washing machine may include a rotating tub; a motor configured to apply a driving force to the rotating tub; a controller configured to determine whether the motor is in a deceleration time or in a stop time, checks a current of a torque component when it is determined as the deceleration time or the stop time, and controls a current of a magnetic flux component greater than the magnitude of the current of the checked torque component to be applied to the motor; and a driver configured to generate a current for driving the motor and apply the generated current to the motor in response to a control command of the controller.

The driver may include a rectifier configured to rectify AC power inputted from a power supply; a smoother configured to smooth the power transmitted from the rectifier and convert the power into constant size DC power; and an inverter configured to convert the transmitted DC power from the smoother into 3-phase AC power, and the smoother may be configured to prevent a rise of DC voltage by a current of the magnetic flux component during deceleration control or stop control of the motor.

The current of the magnetic flux component larger than the magnitude of the current of the checked torque component may be the current of the magnetic flux component larger than the magnitude of the current of the checked torque component.

The current of the magnetic flux component larger than the current of the checked torque component may be a current of the magnetic flux component that is twice as large as the magnitude of the current of the checked torque component.

In accordance with another aspect of the disclosure, a control method of a washing machine including a rotating tub, and a motor applying a driving force to the rotating tub, the method includes: generating a starting current to be applied to the motor when it is a start time of the motor, accelerating the speed of the motor stepwise while the starting current is applied to the motor, checking a current of a torque component when it is determined as a deceleration time or a stop time, and applying a current of a magnetic flux component greater than the magnitude of the current of the checked torque component to the motor.

The accelerating of the speed of the motor stepwise may include controlling a synchronous acceleration of the speed of the motor at a first speed, and controlling the synchronous acceleration of the speed of the motor at a second speed, which is faster than the first speed when the motor speed is in the first speed.

The accelerating of the speed of the motor stepwise may include accelerating the speed of the motor stepwise when the washing machine performs a dehydration stroke.

The applying of the current of the magnetic flux component may include checking the speed of the motor when it is determined as a stop time of the motor, and applying the current of the magnetic flux component to the motor when the speed of the motor is equal to or greater than a reference speed.

According to the present disclosure, an alignment operation may be omitted when the motor is started, and a failure rate of the motor may be reduced by accelerating the speed of the motor in multiple stages.

The present disclosure can prevent an operation time of the washing machine from being delayed due to failure of starting the motor, and can increase the power consumption of the washing machine by restarting the motor.

The present disclosure can stably control the motor after deceleration or stopping of the motor by suppressing the rise of the DC link voltage at the time of deceleration or stopping of the motor, thereby quickly performing left and right stirring of the pulsator in the washing machine and can ensure the reliability of the washing machine.

In addition, the present disclosure can improve the quality and merchandise of the washing machine and further increase user satisfaction, improve the stability of the washing machine and secure the competitiveness of the product.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
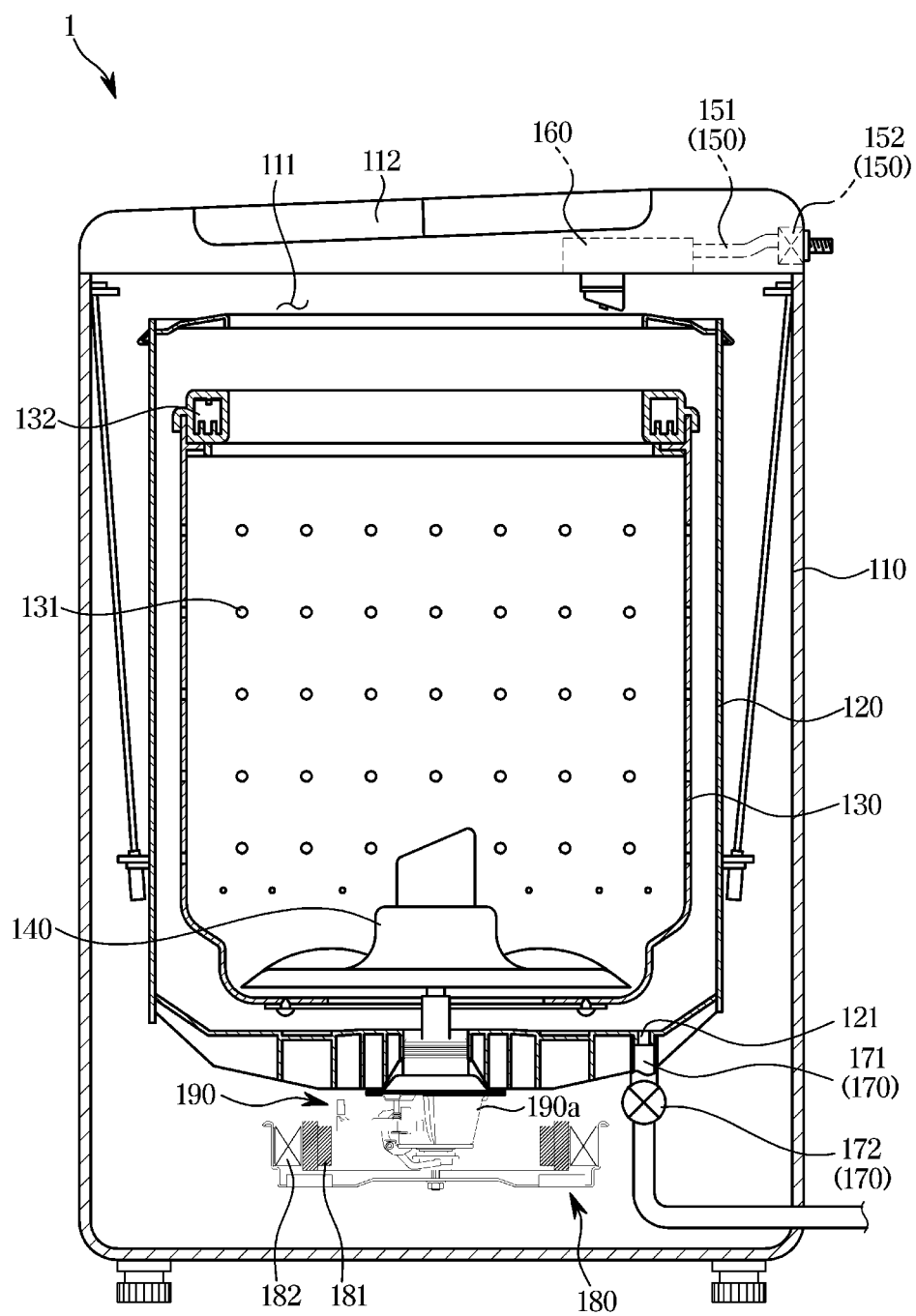
FIG. 1 illustrates a view of a washing machine according to an embodiment.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Reference will now be made in detail to the embodiments of the present disclosure, examples of which are illustrated in the accompanying drawings, wherein like reference numerals refer to like elements throughout. This specification does not describe all elements of the embodiments of the present disclosure and detailed descriptions on what are well known in the art or redundant descriptions on substantially the same configurations may be omitted.

The terms 'unit, module, member, and block' used herein may be implemented using a software or hardware component. According to an embodiment, a plurality of 'units, modules, members, or blocks' may also be implemented using an element and one 'unit, module, member, or block' may include a plurality of elements.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

In this specification, terms "first," "second," etc. are used to distinguish one component from other components and, therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described in detail with reference to the accompanying drawings.

Figure 2:
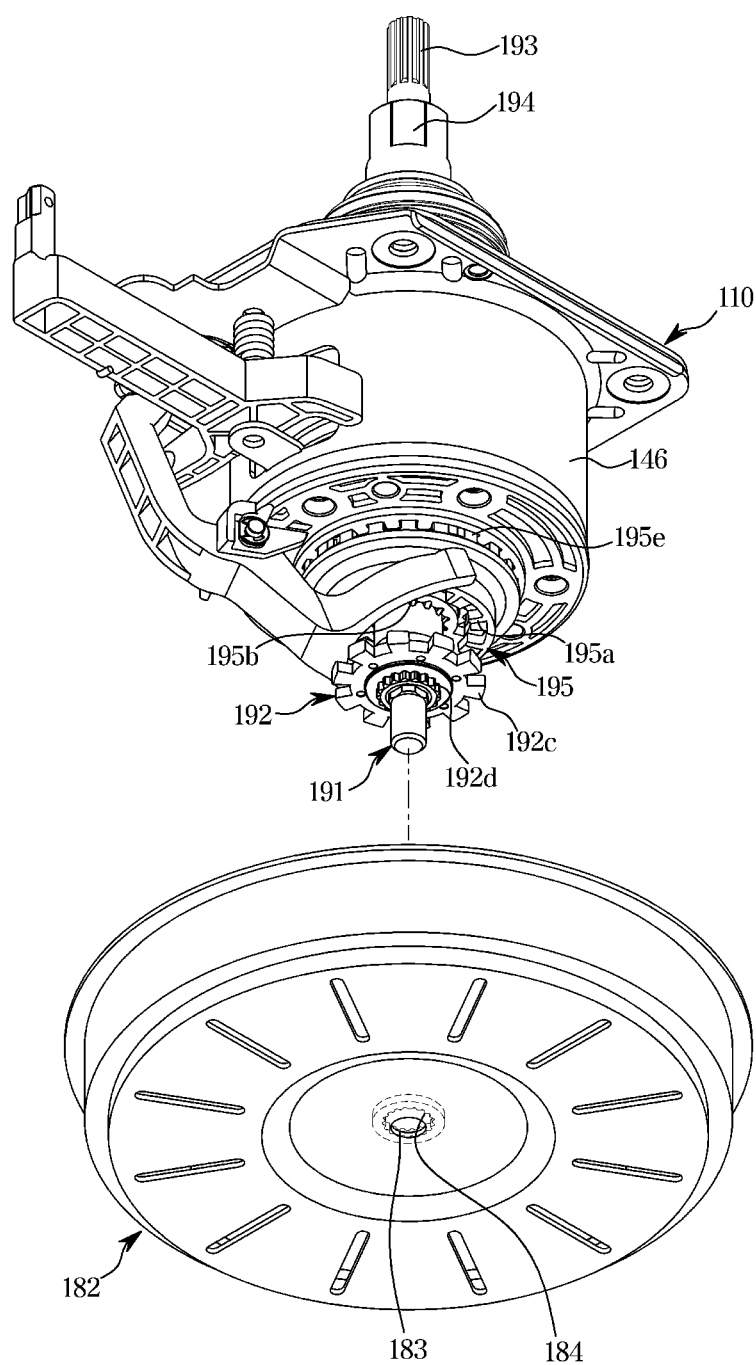
FIG. 2 illustrates a bottom perspective view of a clutch and a rotor provided in a washing machine according to one embodiment.
Figure 3:
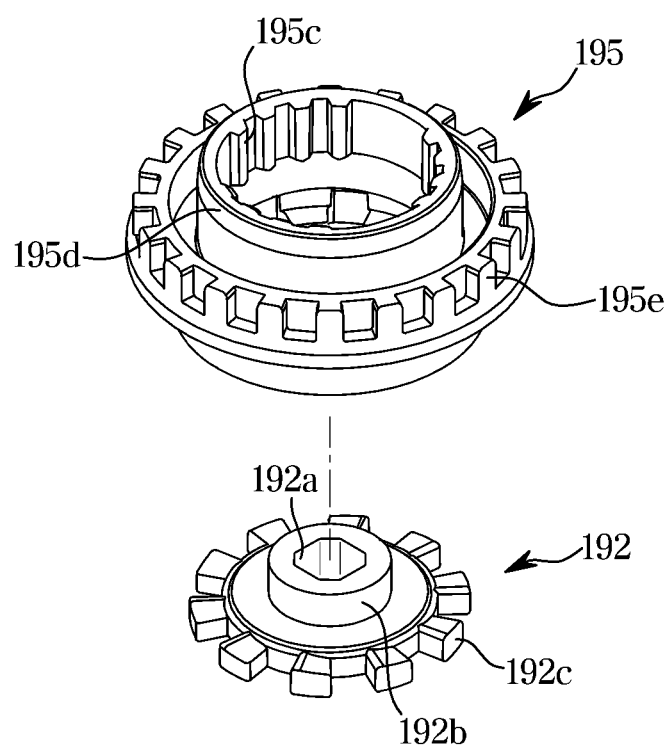
FIG. 3 illustrates a perspective view of a coupling and boss of the clutch shown in FIG. 2.
Figure 4:
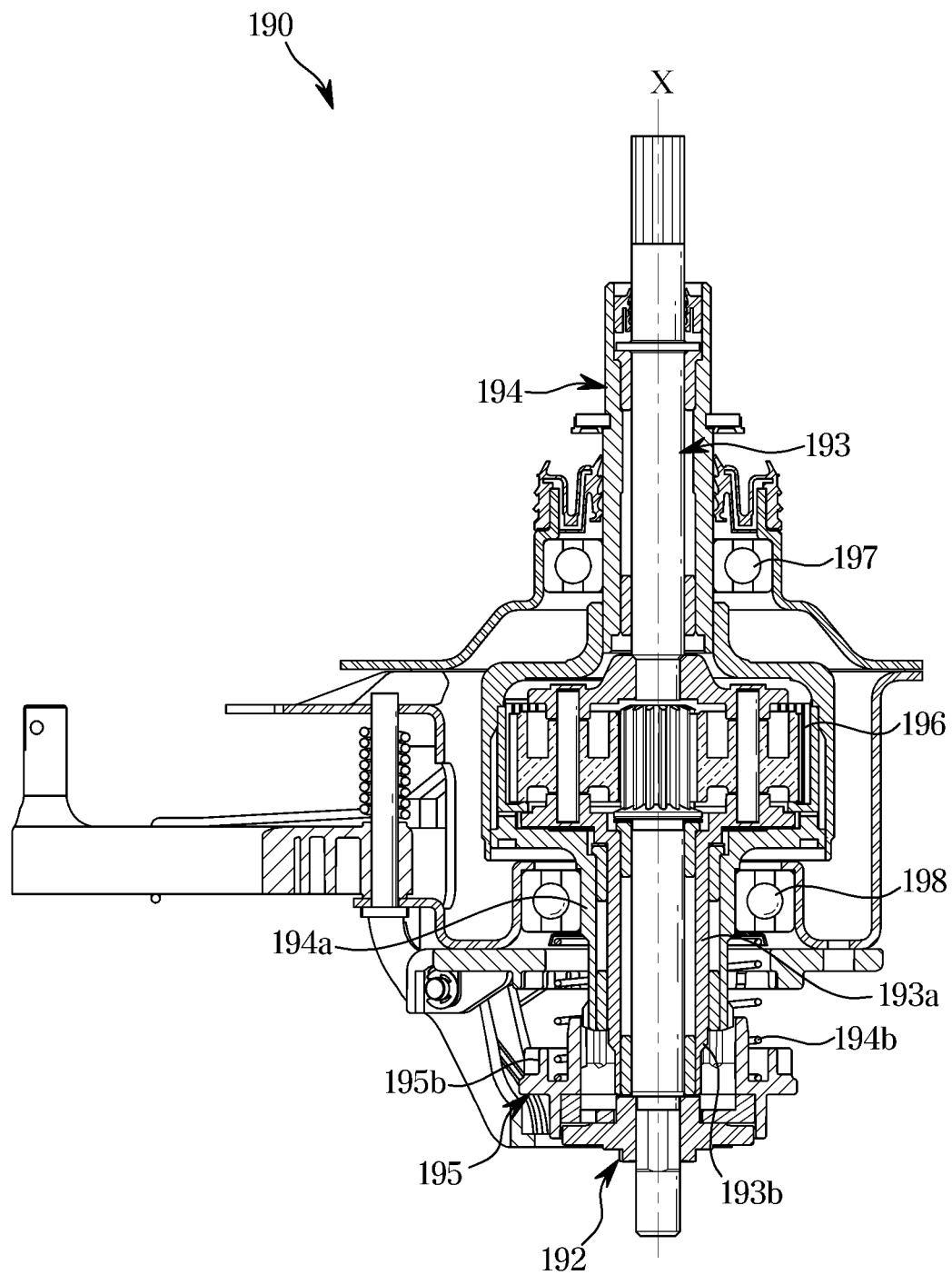
FIG. 4 illustrates a cross-sectional view of a clutch according to one embodiment.
Figure 5:
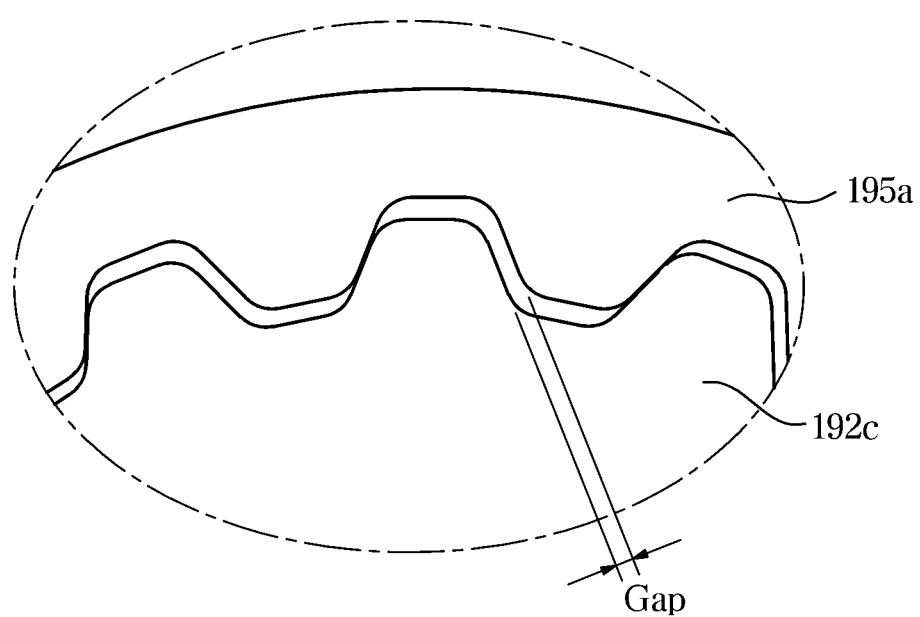
FIG. 5 illustrates a view of a coupling and boss of the clutch shown in FIG. 4.

FIG. 1 illustrates a view of a washing machine according to an embodiment, FIG. 2 illustrates a bottom perspective view of a clutch and a rotor provided in a washing machine according to one embodiment, FIG. 3 illustrates a perspective view of a coupling and boss of the clutch shown in FIG. 2, FIG. 4 illustrates a cross-sectional view of a clutch according to one embodiment, and FIG. 5 illustrates a view of a coupling and boss of the clutch shown in FIG. 4.

The washing machine of an embodiment performs an operation based on the weight of laundry and a washing program and option selected by a user.

A laundry program may include standard laundry, duvet laundry, boil, wool wash, towel wash, and rapid wash, and the options may include at least one of the amount of water, the temperature of the water, the time of a washing stroke, the number of rinsing strokes, the intensity of a dehydrating stroke and the time of a dewatering stroke.

An embodiment describes a top loading washing machine in which a rotating tub is vertically disposed in a main body and a laundry inlet is formed on an upper part of the main body.

As shown in FIG. 1, a washing machine 1 includes a cabinet 110 forming an exterior, a water tank 120 disposed inside the cabinet 110 and storing wash water, and rotatably disposed in the water tank 120 to wash laundry, a rotating tub 130 disposed rotatably inside the water tank 120 to accommodate laundry, and a pulsator 140 rotatably disposed in the interior of the rotating tub 130 to generate water flow by rotation.

An inlet 111 is provided in an upper part of the cabinet 110, and a movable door 112 is provided. Here, the inlet 111 is a place where the laundry is input and discharged, and it can be opened and closed by the door 112.

An upper portion of the water tank 120 is provided with a water supplier 150 for receiving external water and delivering the supplied water to the water tank 120.

The water supplier 150 includes a water supply pipe 151 connected to an external water supply source, and a water supply valve 152 provided in the water supply pipe 151 to allow or block the supply of water.

The washing machine 1 further includes a detergent supplier 160 storing detergent and supplying the stored detergent to the water tank 120 and the rotating tub 130.

That is, the water supplied through the water supply pipe 151 of the water supplier may move into the water tank 120 and the rotating tub 130 together with the detergent via the detergent supplier 160.

The rotating tub 130 is provided in a cylindrical shape with an open top, and includes a plurality of holes 131 provided on an outer circumferential surface. Here, the plurality of holes 131 allow an inner space of the rotating tub 130 and an inner space of the water tank 120 to communicate with each other, so that water may flow between the inner space of the rotating tub 130 and the inner space of the water tank 120.

An upper portion of the rotating tub 130 may be equipped with a balancer 132 to offset an unbalanced load generated in the rotating tub 130 when the rotating tub 130 rotates so that the rotating tub 130 rotates stably.

The pulsator 140 performs forward rotation or reverse rotation and generates water flow. At this time, the laundry in the rotating tub 130 by the water flow of the pulsator 140 may be stirred with the wash water.

The washing machine 1 may further include a drain 170 for discharging the water of the water tank 120 to the outside. That is, the drain 170 may include a drain pipe 171 connected to a drain port 121 of the water tank 120, and a drain valve 172 for controlling drainage of the drain pipe 171.

The washing machine 1 further includes a motor 180 and a clutch 190 to rotate at least one of the rotating tub 130 and the pulsator 140 so that the washing machine can perform various strokes. The present embodiment will be described with an example of a direct type structure in which the motor 180 and the clutch 190 are vertically arranged in a row.

The motor 180 is provided at a lower end of the water tank 120, and generates a driving force when power is applied, and applies the generated driving force to at least one of the rotating tub 130 and the pulsator 140.

The motor 180 includes a circular stator (i.e., a stator 181) and a rotor (i.e., a rotor 182) disposed on an outer circumference of the stator 181.

The stator 181 may include an annular base, a plurality of teeth disposed along an outer circumference of the base and protruding outward with respect to the radial direction of the stator, and a coil wound around each of the plurality of teeth. The coil may generate a magnetic field by a current flowing through the coil, and the plurality of teeth may be magnetized by the generated magnetic field.

When the stator is engaged with the clutch 190, the clutch 190 may be seated on a mounting surface of the stator.

The rotor 182 includes a plurality of permanent magnets disposed on an inner surface of a side wall, which permanently interact with the coil of the stator. This rotates the rotor.

As a driving shaft 191 is coupled to the rotor 182, the driving shaft 191 and the rotor 182 of the clutch 190 may be coupled to each other. The driving shaft 191 coupled to the rotor 182 is connected to a washing shaft 193 through a hollow of a dehydration shaft 194, and the washing shaft 193 again penetrates the hollow of the dehydration shaft 194 and is coupled to the pulsator 140.

As shown in FIG. 2, a rotor hole 183 may be provided at the center of the rotor 182. A serration 184 may be provided around the rotor hole 183 to couple the driving shaft 191. That is, the driving shaft 191 and a boss 192 coupled to the serration 184 may rotate.

The clutch 190 is disposed between the motor 180 and the water tank 120 and receives the driving force from the motor 180, and the driving force of the motor 180 is selectively transmitted to the rotating tub 130 and the pulsator 140.

The clutch 190 includes a housing 190a that protects an internal configuration of the clutch. A portion of the driving shaft 191 protrudes from a lower portion of the housing 190a of the clutch, and a portion of the washing shaft 193 and the dehydration shaft 194 protrude from the upper portion.

The driving shaft 191 is connected to the boss 192, and the power generated from the motor 180 is transmitted to the washing shaft 193 and the dehydration shaft 194.

The driving shaft 191 is a rod-shaped shaft, and always rotates integrally with the motor 180.

The boss 192 is a component to which the driving force of the motor 180 is primarily transmitted, and always rotates integrally with the motor 180.

As shown in FIGS. 2 and 3, the boss 192 may include the boss hole 192a formed in the center, the circular hub 192b surrounding the boss hole 192a and the boss teeth 192c formed along an outer circumference of the hub 192b. The boss hole 192a may have a polygonal cross section.

The boss 192 transmits power to the driving shaft 191 coupled to the boss hole 192a.

The boss teeth 192c include a plurality of boss protrusions protruding radially from the outer circumference of the hub 192b and a plurality of boss grooves formed in a groove shape between the boss protrusions.

When a coupling 195 is in a lowered position, the boss teeth 192c are engaged with a coupling gear 195a of the coupling, whereby the power of the motor 180 is transmitted to the coupling 195, thereby allows the coupling 195 to rotate.

The boss 192 may be provided at the outer circumference of the hub 192b and further include a boss gear 192d corresponding to the serration 184 of the rotor 182.

As shown in FIG. 4, the washing shaft 193 is a cylindrical shaft whose center is empty, and the driving shaft 191 may be inserted into a hollow portion. Washing shaft teeth 193b may be provided on an outer circumferential surface of a lower side 193a of the washing shaft 193. Here, the lower side 193a of the washing shaft 193 may be a lower laundry shaft.

The washing shaft teeth 193b may have a serration structure in which a plurality of protrusions are spaced apart along the outer circumferential surface of the lower side 193a of the washing shaft 193. The washing shaft teeth 193b may be selectively engaged with a restricting portion 195b of the coupling 195.

The dehydration shaft 194 is a cylindrical shaft having an empty central portion, and the washing shaft 193 may be inserted into the hollow portion. Therefore, a lower side of the washing shaft 193 surrounds the driving shaft 191 positioned at the center, and a lower side of the washing shaft may have a structure wrapped around the dehydration shaft.

Dehydration shaft teeth 194b may be provided at an outer circumference of a lower side 194a of the dehydration shaft. The dehydration shaft teeth 194b may have a serration structure in which the plurality of protrusions are spaced apart along an outer circumferential surface of the lower side 194a of the dehydration shaft. Here, the lower side 194a of the dehydration shaft may be a lower dehydration shaft.

The dehydration shaft teeth 194b may be located above the washing shaft teeth 193b. The dehydration shaft teeth 194b may be selectively engaged with a coupling portion 195c of the coupling 195. When the lower side 194a of the dehydration shaft 194 is coupled to the coupling 195, the motor 180 may be engaged. Power is transmitted to the dehydration shaft 194 via the coupling 195.

The dehydration shaft teeth 194b may be located above the washing shaft teeth 193b.

The dehydration shaft teeth 194b may be selectively engaged with the coupling portion 195c of the coupling 195, and the motor 180 may be engaged when the lower side 194a of the dehydration shaft 194 is coupled to the coupling 195. Power is transmitted to the dehydration shaft 194 via the coupling 195.

The coupling 195 is configured to restrict the rotation of the lower side 193a of the washing shaft or transfer power to the lower side 194a of the dehydration shaft, depending on the position, so that the clutch 190 switches to a first or second operation mode. The first operation mode and the second operation mode will be described later.

The driving shaft 191 has the same rotating axis X as the lower side 194a of the dehydration shaft 194 and the lower side 193a of the washing shaft, and the coupling 195 changes its position in the direction of the rotating axis X, whereby a rotational force is transmitted to the washing shaft 193 or the dehydration shaft 194.

As shown in FIGS. 3 and 4, the coupling 195 may include a cylindrical body 195d with a hollow portion formed therein. The driving shaft 191, the lower side 193a of the washing shaft, and the lower side 194a of the dehydration shaft may pass through the hollow portion of the body 195d.

The coupling gear 195a and the restricting portion 195b may be provided inside the lower portion of the body 195d of the coupling, and the coupling portion 195c may be provided on an inner circumferential surface of the upper portion.

Since the lower side 194a of the dehydration tank surrounds the outer periphery of the lower side 193a of the washing shaft, the diameter of the lower side 194a of the dehydrating tank is larger than the diameter of the lower side 193a of the washing shaft. Therefore, the inner diameter of the coupling portion 195c corresponding to the lower side 194a of the dehydration tank should be larger than the inner diameter of the restricting portion 195b corresponding to the lower side 193a of the washing shaft. In addition, the restricting portion 195b may be provided in a serration form.

The coupling gear 195a of the coupling may include a plurality of protrusions and a groove formed between the plurality of protrusions.

The plurality of protrusions of the coupling gear 195a can be easily engaged with the boss teeth 192c of the boss, and the boss teeth 192c of the boss may have a shape, position, and size corresponding to the shape, position, and size of the boss protrusion.

The coupling gear 195a and the boss teeth 192c of the boss may be coupled with a gap of a predetermined size or larger.

More specifically, as shown in FIG. 5, when the projection of the coupling gear 195a is located in the boss groove of the boss teeth 192c, the projection of the coupling gear and the boss groove of the boss teeth may have a gap of a first predetermined size or larger.

In addition, when the boss protrusion of the boss teeth 192c is located in the groove of the coupling gear 195a, the groove of the coupling gear 195a and the boss protrusion of the boss teeth 192c may have a gap of the first predetermined size or larger.

The coupling portion 195c of the coupling 195 may include the plurality of protrusions and the groove formed between the plurality of protrusions.

The plurality of protrusions of the coupling portion 195c of the coupling 195 can be easily engaged with and coupled to the dehydration shaft teeth 194b, and the coupling 195 may have a shape, position, and size corresponding to the shape, position, and size of the protrusion of the dehydration shaft teeth 194b.

The coupling portion 195c of the coupling 195 and the dehydration shaft teeth 194b may be coupled to each other with a gap greater than or equal to a second predetermined size.

More specifically, when the protrusion of the coupling portion 195c of the coupling 195 is located in the groove of the dehydration shaft teeth 194b, the protrusion of the coupling portion and the groove of the dehydration shaft teeth 194b may have a gap of the second predetermined size or larger.

When the protrusion of the dehydration shaft teeth 194b is located in the groove of the coupling portion 195c of the coupling 195, the groove of the coupling portion and the protrusion of the dehydration shaft teeth 194b may have a gap of the second predetermined size or larger.

Due to such gap, the motor may be unstable to start when the motor is started. However, the present embodiment may solve the starting instability of the motor by increasing the speed of the motor stepwise.

The coupling 195 may include coupling teeth 195e. The coupling teeth 195e may be arranged to protrude from an outer circumference of the body 195d to surround the body 195d.

The coupling teeth 195e include a plurality of coupling protrusions protruding radially outward along the outer circumference, and a plurality of coupling grooves formed between each of the coupling protrusions.

The clutch 190 further includes at least one gear assembly 196.

The gear assembly 196 is connected to the driving shaft 191, the washing shaft 193 and the dehydration shaft 194, and the power of the motor 180 is transmitted from the driving shaft 191 to at least one of the washing shaft 193 and the dehydration shaft 194.

The clutch 190 may further include a first bearing 197 disposed adjacent to the dehydration shaft 194 and a second bearing 198 disposed adjacent to the driving shaft 191.

The first bearing 197 and the second bearing 198 may guide the dehydration shaft 194 and the driving shaft 191 to rotate smoothly.

The first bearing 197 may be a one-way bearing that allows the dehydration shaft 194 to rotate in only one direction. That is, the first bearing 197 may allow the dehydration shaft 194 to rotate only in a first direction and not to rotate in a second direction. Here, the first direction and the second direction may be opposite to each other.

The first operation mode of the clutch 190 is a mode in which the clutch operates when the washing machine is in the washing stroke or the rinsing stroke, and the rotating tub is a mode in which only the pulsator rotates in a stopped state.

In addition, the first operation mode can also operate to move in some part of the washing stroke, some part of the cleaning stroke, or some part of the rinsing stroke.

In the first operation mode, the washing shaft teeth 193b are positioned above the restricting portion 195b without engaging the restricting portion 195b of the coupling 195, and the dehydration shaft teeth 194b of the lower side of the dehydration shaft 194 are located below the coupling portion 195c without engaging the coupling portion 195c of the coupling 195.

That is, the washing shaft teeth 193b and the dehydration shaft teeth 194b are positioned in a flat portion between the restricting portion 195b and the coupling portion 195c of the coupling 195.

The coupling 195 does not engage with any of the washing shaft teeth 193b and the dehydration shaft teeth 194b when in the first operation mode.

The configuration of rotating the pulsator during the washing stroke or the rinsing stroke has been described. It is also possible to rotate only the rotating tub by combining the coupling with the dehydration shaft and to rotate the pulsator and the rotating tub alternately.

In the second operation mode, the power of the motor 180 is transmitted to the wash shaft 193 via an idle of the gear assembly 196 via the driving shaft 191 to rotate the pulsator 140.

At this time, the rotation direction of the motor 180 and the rotation direction of the pulsator 140 are the same, but the rotational speed may be different. This difference can depend on the number of gear teeth in the gear assembly.

The second operation mode of the clutch 190 is a mode that operates during the dehydration stroke of the washing machine, in which water containing laundry is separated by rotating the rotating tub and the pulsator at high speed.

However, in some cases, it is also possible to operate in the second operation mode even during the washing or rinsing stroke.

When the coupling 195 is in the lowered position, the coupling gear 195a of the coupling 195 is engaged with the boss teeth 192c of the boss 192. The coupling portion 195c of the coupling 195 is engaged with the dehydration shaft teeth 194b. Washing shaft teeth 193c may not be engaged with the coupling 195 because they are located on the flat portion of the coupling 195.

In the second mode of operation, the power of the motor 180 is transmitted to the coupling 195 coupled with the boss 192 as well as to the driving shaft 191. The dehydration shaft 194 is also rotated by the dehydration shaft teeth 194b engaged with the coupling portion 195c of the coupling 195.

Thus, power transmission does not occur between the gear assemblies because the rotational speed of the driving shaft 191 and the rotational speed of the dehydration shaft 194 are the same.

In other words, the washing shaft 193 and the dehydration shaft 194 rotate as one rigid body. That is, in the second operation mode, the rotational speed of the motor 180, the rotational speed of the pulsator 140, and the rotational speed of the rotating tub 130 are all the same, and the rotational direction is also the same.

Figure 6:
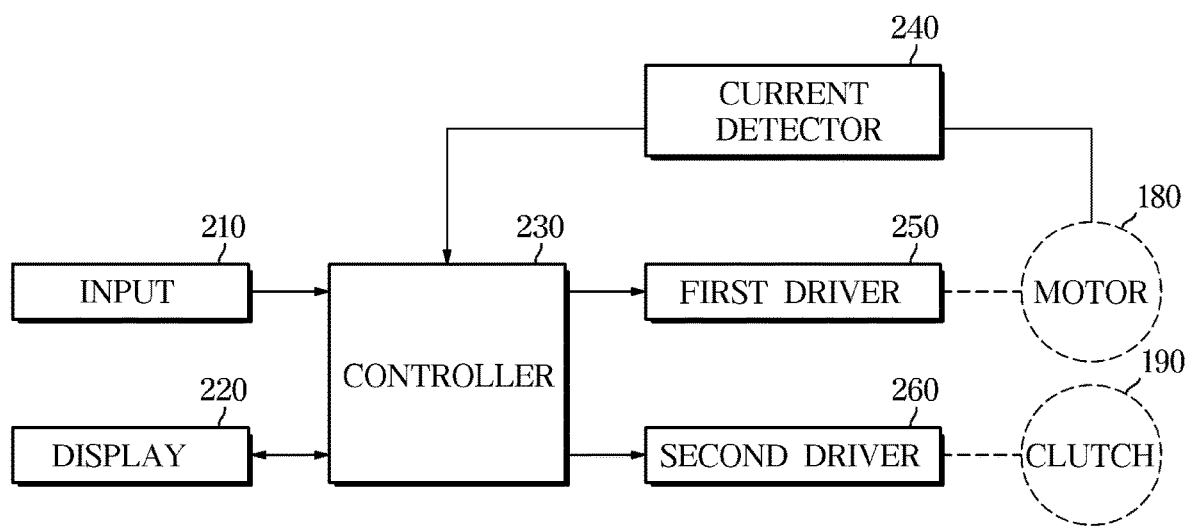
FIG. 6 illustrates a control block diagram of a washing machine according to an embodiment.
Figure 7:
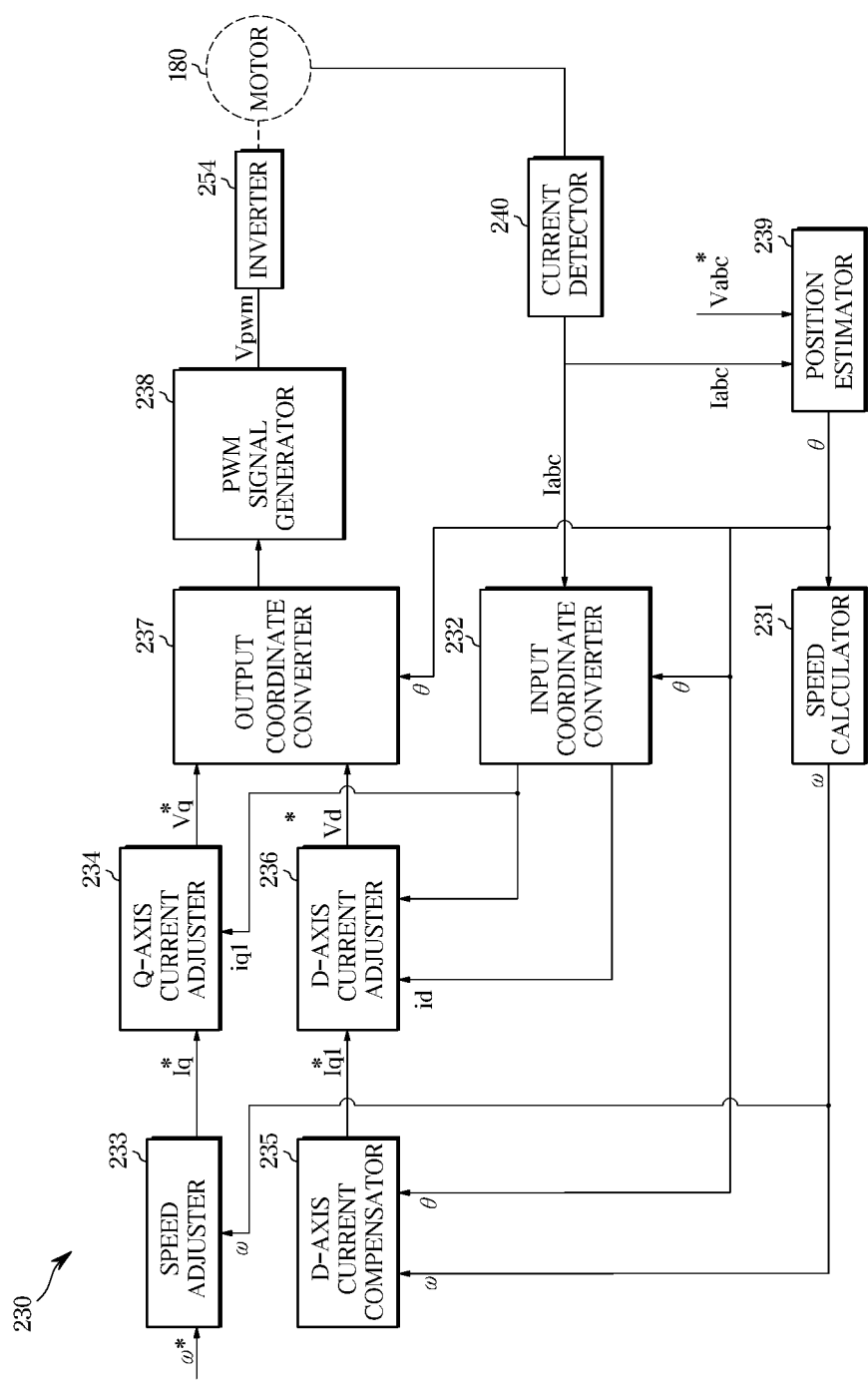
FIG. 7 illustrates a detailed configuration diagram of a controller shown in FIG. 6.
Figure 8:
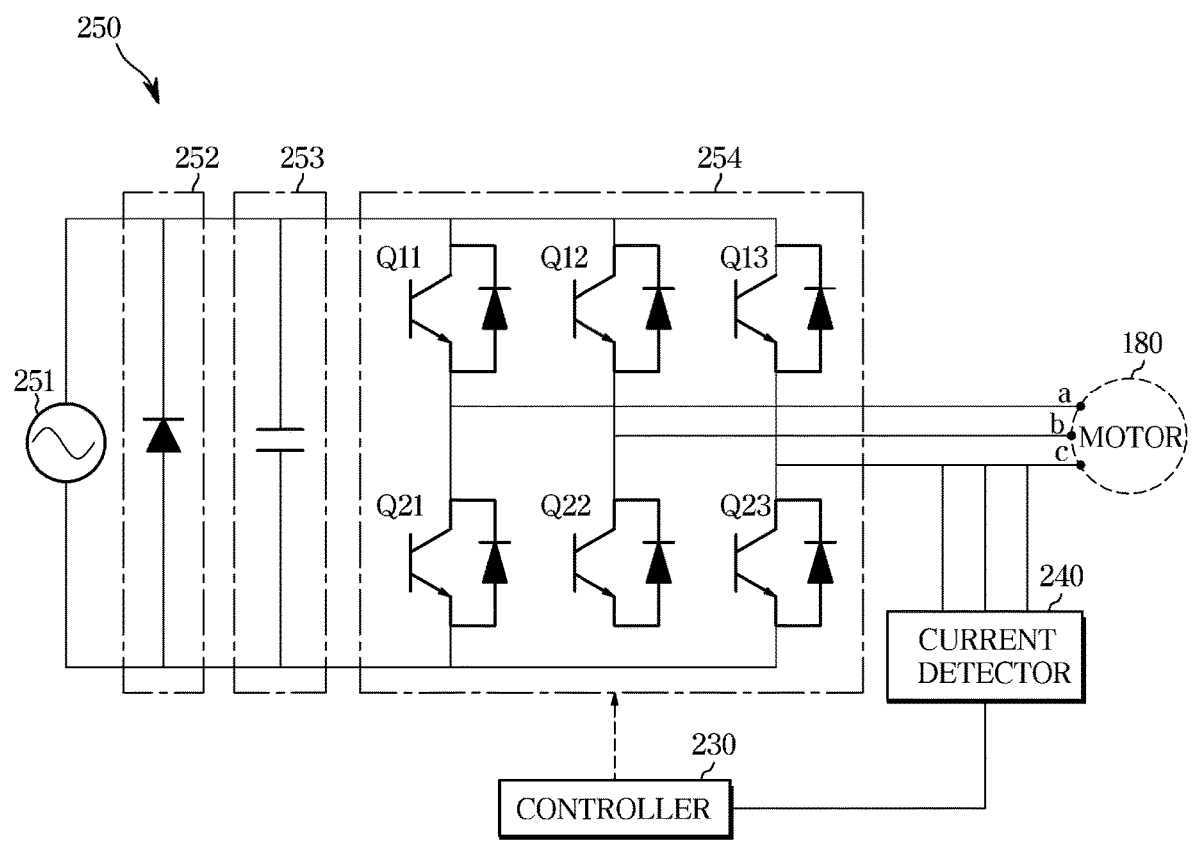
FIG. 8 illustrates a detailed configuration diagram of a first driver illustrated in FIG. 6.

FIG. 6 illustrates a control block diagram of a washing machine according to an embodiment, FIG. 7 illustrates a detailed configuration diagram of a controller shown in FIG. 6, and FIG. 8 illustrates a detailed configuration diagram of a first driver illustrated in FIG. 6.

As shown in FIG. 6, the washing machine 1 includes an input 210, a display 220, a controller 230, a current detector 240, a first driver 250, and a second driver 260.

The input 210 receives an operation command from the user.

The input 210 may include a plurality of buttons for receiving a start, pause, and stop command, and may further include a button for receiving the laundry program.

In addition, the input 210 may further include a button for receiving an option.

The display 220 displays information related to the state or operation of the washing machine 1, displays information input to the input 210, and displays information for guiding the user's input.

The options may include at least one of the amount of water, the temperature of the water, the time of the washing stroke, the number of the rinsing strokes, the intensity of the dehydration stroke and the time of the dehydration stroke.

The controller 230 controls the overall operation of the washing machine 1.

The controller 230 controls the operation of the washing machine based on the weight of the laundry, the washing program and the options input to the input 210.

When the controller 230 controls the operation of the washing machine, by controlling the operation of the water supplier 150, the drain 170, the motor 180, and the clutch 190, and controlling the operation of the washing stroke, the rinsing stroke and the dehydration stroke corresponding to the elected washing program, the at least one option is performed.

More specifically, the controller 230 checks the weight of the laundry corresponding to sensing information detected by a weight detector when the laundry program is executed, and controls the washing and rinsing strokes while adjusting the water supply based on the identified laundry weight and the washing program selected by the user, and controls the dehydration stroke based on the weight of the laundry identified and the washing program.

The controller 230 controls the operations of the water supplier 150, the motor 180, the clutch 190, and the drain 170 in controlling the washing stroke and the rinsing stroke, and controls the operation of the motor 180, the clutch 190, and the drain 170 in the dehydration stroke.

The controller 230 may control the clutch 190 to the first operation mode during the washing stroke and the rinsing stroke, and may control the clutch 190 to the second operation mode during the dehydration stroke control.

When the controller 230 performs the dehydration stroke, the controller 230 gradually increases the speed of the motor and controls the starting of the motor. In this case, the motor 180 may be in a state of rotating only in one direction by the first bearing 197 of the clutch.

More specifically, the controller 230 controls the speed of the motor to a preset speed when controlling the starting of the motor, and when the speed of the motor is the preset speed (i.e., a first speed), the motor speed is maintained and controlled for a predetermined time at the first speed for a predetermined time. After a certain time elapses, the motor speed is controlled to a second speed faster than the preset speed, and when the speed of the motor is the second speed, it is determined that the starting of the motor is completed, and the speed of the motor is controlled at the target speed for performing the dehydration stroke.

The target speed here may vary depending on the dehydration time and the dehydration intensity.

When the motor accelerates to the first speed, the rotational speed of the motor may be about ⅕ of the rotational speed of the preset motor. When the motor accelerates from the first speed to the second speed, the rotational speed of the motor may be approximately ⅘ of the preset rotational speed of the motor.

The preset speed may be a synchronous acceleration speed and a speed less than 5 rpm at the first speed. The second speed is a synchronous acceleration speed, which is faster than 5 rpm, and may be five times the speed of the first speed.

When the controller 230 accelerates the motor speed to the first speed, the controller 230 may rotate the motor by a first predetermined number, and when the speed of the motor is accelerated from the first speed to the second speed, the motor may be rotated by a second predetermined number. The second predetermined number may be greater than the first predetermined number.

In addition, when the speed of the motor reaches the second speed, the controller 230 may rotate the motor by a third predetermined number at the second speed.

In addition, when controlling the starting of the motor, the controller 230 accelerates and controls the speed of the motor up to the preset speed, and when the motor speed is the predetermined speed (that is, the first speed), the controller 230 accelerates and controls the speed of the motor up to a predetermined second speed, and when it is determined that the speed of the motor is the second speed, then the controller 230 determines that the starting of the motor is completed, and controls the speed of the motor at the target speed for performing the dehydration stroke.

In addition, the controller 230 controls the speed of the motor to the preset speed when controlling the starting of the motor, and when the speed of the motor is the preset speed (i.e., the first speed), the motor is rotated by a preset number of times, and then the speed of the motor is accelerated to the second speed, which is faster than the preset speed, and when it is determined that the speed of the motor is the second speed, it is determined that the starting of the motor is completed, and the speed of the motor is controlled at the target speed for performing the dehydration stroke.

As such, when the controller 230 controls the starting of the motor while the clutch is in the second operation mode, by increasing the speed of the motor stepwise while the starting current is applied, an alignment operation of the rotor can be omitted during the control of starting the motor.

In addition, by increasing the speed of the motor stepwise to start the motor at the time of rotation of the rotating tub, the instability of motor starting due to a gap between the coupling gear 195a and the boss teeth 192c and a gap between the coupling portion 195c and the dehydration shaft teeth 194b of the coupling 195 can be eliminated.

The controller 230 rotates the motor at the first speed, which is 1/10 of the speed of the existing motor, to synchronize between the permanent magnet of the rotor and the coil position of the stator. This can reduce the motor failure rate.

The controller 230 receives a current supplied to the motor 180 detected by the current detector 240, and controls the speed of the motor 180 based on a comparison result between the detected current and the target current to stop the motor 180 by normal deceleration control.

That is, the controller 230 controls the first driver to supply a current to the motor 180 to generate a rotational force, thereby performing the washing, rinsing, and dehydrating strokes, and reduces the speed of the motor during each of the strokes, and stops the motor 180 when each of the strokes is completed.

In addition, when the stop command is input from the user even during the washing, rinsing, and dehydrating strokes, the controller 230 may control the first driver to stop the motor 180.

In other words, the controller 230 may control the first driver to operate, decelerate, or stop the motor 180 according to an input operation command, operation mode, and the like.

The controller 230 reduces the target speed during the deceleration or stop control of the motor during the washing, rinsing, and dehydrating stroke control, and applies a current of a magnetic flux component (d-axis current) larger than a torque component current (q-axis current) to the motor.

In this way, by suppressing a rise of DC link voltage when the motor decelerates or stops, the motor can be stably controlled after the motor decelerates or stops, and this can quickly perform left and right stirring of the pulsator in the washing machine, and the reliability of the washing machine can be secured.

In addition, the controller 230 may apply the current of the magnetic flux component (d-axis current) larger than the torque component current (q-axis current) applied to the motor even when controlling the deceleration and stopping of the motor when the weight of laundry is sensed.

The controller 230 may apply the current (d-axis current) of the magnetic flux component greater than the torque component current (q-axis current) applied to the motor when the stop command is received while the speed of the motor is greater than or equal to a reference speed. This is because when the motor speed is greater than or equal to the reference speed, a back electromotive force greater than a reference back electromotive force is generated and the DC link voltage is increased by this back electromotive force.

The configuration of the controller 230 and the first driver 250 will be described later with reference to FIGS. 7 and 8.

The controller 230 may further control a cold water supply or a hot water supply based on the temperature of the selected water in the washing stroke and the rinsing stroke control.

The controller 230 controls the operation of the display 220 to display the washing program selected by the user and the at least one option.

The controller 230 controls the operation of the display 220 to display the washing program and the at least one option selected by the user.

The current detector 240 detects a current applied to the motor and transmits information corresponding to the detected current to the controller 230.

The first driver 250 drives the motor 180 based on the control command of the controller 230. The first driver 250 may include an inverter.

That is, the first driver 250 may include the inverter that generates a current for driving the motor according to the control command of the controller 230 so that the motor 180 generates the driving force.

The second driver 260 operates the clutch in the first operation mode or the second operation mode based on the control command of the controller 230.

As shown in FIG. 7, the controller 230 includes a speed calculator 231, an input coordinate converter 232, a speed controller 233, a q-axis current controller 234, a d-axis current compensator 235, a d-axis current controller 236, an output coordinate converter 237, a PWM signal generator 238, and a position estimator 239.

The speed calculator 231 calculates a rotational speed w of the motor based on a position θ of the rotor estimated by the position estimator 239.

The input coordinate converter 232 converts a-, b- and c-phase currents detected by the current detector 240 into a d-axis current and a q-axis current based on the position θ of the rotor of the motor.

The speed controller 233 compares the target speed (or command speed, w*) input from the outside with the rotational speed w of the motor, and outputs a q-axis current command Iq* according to the comparison result.

The speed controller 233 may include a proportional controller (P), a proportional integral controller (PI), or a proportional integral derivative controller (PID).

The q-axis current controller 234 compares the q-axis current command Iq* output from the speed controller 233 with a q-axis current Iq of the motor, and according to the comparison result, outputs a q-axis voltage command Vq*. The q-axis current controller 234 may also include the proportional controller, the proportional integral controller, or the proportional integral derivative controller.

The q-axis current may be the torque component current of the motor.

The d-axis current compensator 235 outputs a d-axis current command Id* based on the rotational speed w of the motor and the position θ of the rotor.

The d-axis current controller 236 compares the d-axis current command Id* output from the d-axis current compensator 235 with the d-axis current Id* of the motor, and according to the comparison result, outputs a d-axis voltage command Vd*. The d-axis current controller 236 may also include the proportional controller, the proportional integral controller, or the proportional integral derivative controller.

Here, the d-axis current may be a current of the magnetic flux component.

The d-axis current controller 236 checks the q-axis current Iq when the motor decelerates or stops, generates the d-axis current command Id* larger than the identified q-axis current Iq, and generates the generated d-axis current command Id*, and outputs the d-axis current command Id*.

The d-axis current controller 236 checks the q-axis current Iq when the motor decelerates or stops, generates the d-axis current command Id* larger than the identified q-axis current Iq, and outputs the generated d-axis current command Id*.

This allows the d-axis current to flow in the opposite direction to the flow of the q-axis current when the motor is decelerated or stopped, thereby providing a force opposite to the direction of rotation to the motor, and preventing a rise of the DC link voltage due to the q-axis current.

The output coordinate converter 237 converts the d-axis voltage command Vd* and the q-axis voltage command Vq* into a-, b-, and c-phase voltage commands Vabc* based on the position of a rotor θ.

When the motor decelerates or stops, the output coordinate converter 237 converts the d-axis voltage command Vd* into the a-, b-, and c-phase voltage commands Vabc* based on the d-axis current command Id* larger than the q-axis current Iq.

When the motor decelerates or stops, the q-axis current command may have a negative value and have a reduced current command, or the q-axis current command Iq* may be zero.

At this time, when the stop command is received while the rotational speed of the motor is faster than the reference speed, a counter electromotive force greater than the reference back electromotive force is generated, and the DC link voltage of the smoothing part may increase by approximately 310V or more.

The PWM signal generator 238 generates a control signal VPWM to be provided to an inverter 254 based on the a-, b-, and c-phase voltage commands Vabc*.

Specifically, each of the a-, b-, and c-phase voltage commands Vabc* is pulse width modulated (PWM) to turn on/off a plurality of switching circuits Q11 to Q13 and Q21 to Q23 of the inverter 254 and outputs the control signal VPWM.

The position estimator 239 may estimate the position of the rotor θ based on a current Iabc detected by the current detector 240 and a voltage command Vabc* output from the output coordinate converter 237.

The controller 230 controls the operation of the motor by converting an a-phase, b-phase and c-phase of the motor to the d-axis and q-axis. Specifically, the controller 230 converts the a-phase, b-phase and c-phase currents of the motor into the d-axis and q-axis currents, and converts a-phase, b-phase and c-phase voltages into d- and q-axis voltages.

Here, the d-axis refers to the axis of the direction coinciding with the direction of the magnetic field generated by the rotor of the motor, the q-axis refers to the axis of 90 degrees ahead of the direction of the magnetic field generated by the rotor. Here, 90 degrees refers to an electric angle obtained by converting an angle between adjacent N poles or an angle between adjacent S poles into 360 degrees, not a mechanical angle of the rotor.

The controller 230 can generate a pulse width modulated signal VPWM based on the current Iabc detected by the current detector 240, a rotational speed w of the rotor, and the voltage command Vabc* output from the output coordinate converter 237.

In detail, the controller 230 calculates a current command to be applied to the motor based on the rotational speed w and the current Iabc of the motor, and calculates a voltage command to be applied to the motor based on the current command. Thereafter, the controller 230 generates the control signal VPWM by performing a pulse width modulation (PWM) on the voltage command to the motor 180.

The plurality of switching circuits Q11 to Q13 and Q21 to Q23 of the inverter may be turned on/off by the control signal VPWM output from the controller 230.

In addition, the inverter 254 may apply a driving voltage corresponding to the voltage command to the motor according to the ratio of the on time of the plurality of switching circuits, that is, a duty rate, and supply the current Iabc corresponding to the current command to the motor.

As shown in FIG. 8, the first driver 250 includes a power supplier 251, a rectifier 252, a smoother 253, and the inverter 254.

The power supplier 251 is connected to an external power supply terminal, receives commercial AC power from the outside, and delivers it to the rectifier 252.

The rectifier 252 includes at least one diode, rectifies AC power input from the power supplier 251 and delivers the rectified power to the smoother 253.

The smoother 253 includes at least one capacitor, smoothes the power delivered from the rectifier 252 to lower the pulsation of the current from the rectified power in the rectifier 252, and converts the power into direct current (DC) power of a predetermined size for driving the motor 180 and transmits the power to the inverter 254.

The inverter 254 includes the plurality of switching circuits for converting the DC power transmitted from the smoother 253 into 3-phase AC power. The plurality of switching circuits of the inverter 254 are driven according to the control command of the controller 230 to modulate the pulse width transmitted to the motor 180.

The plurality of switching circuits of the inverter 254 may include the three upper switching circuits Q11 to Q13 and the three lower switching circuits Q21 to Q23.

Each of the three upper switching circuits Q11 to Q13 and the three lower switching circuits Q21 to Q23 may be connected in series. That is, the first upper switching circuit Q11 is connected to the first lower switching circuit Q21 in series on a U stage. The second upper switching circuit Q12 is connected in series with the second lower switching circuit Q22 on a V stage. The third upper switching circuit Q13 may be connected in series with the third lower switching circuit Q23 on a W phase. In addition, a diode may be connected in parallel with the U, V, and W phases.

In addition, three nodes to which the three upper switching circuits Q11 to Q13 and the three lower switching circuits Q21 to Q23 are connected are respectively connected to three input terminals a, b, and c of the motor 100. Accordingly, the current may be supplied to the motor 180 through the three input terminals a, b, and c.

The controller 230 may control the opening and closing of the upper switching circuits Q21 to Q23 and the lower switching circuits Q21 to Q23, that is, on/off, to adjust the current applied to the motor 180.

The current detector 240 detects a current value applied to the motor 180 and detects a current value flowing through the three input terminals a, b, and c connected to the motor 180.

Figure 9:
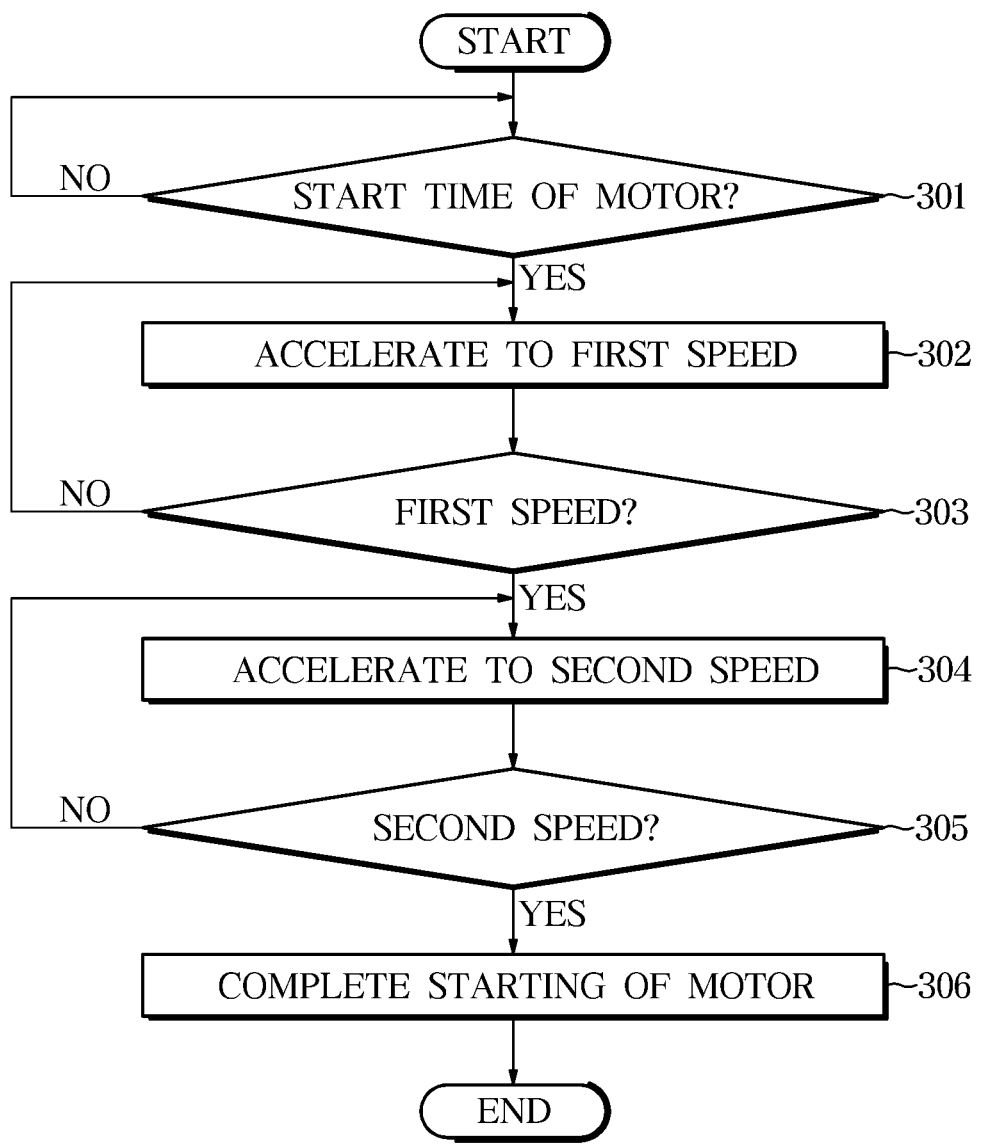
FIG. 9 is a flowchart illustrating a start control of a motor provided in a washing machine according to an exemplary embodiment.
Figure 10:
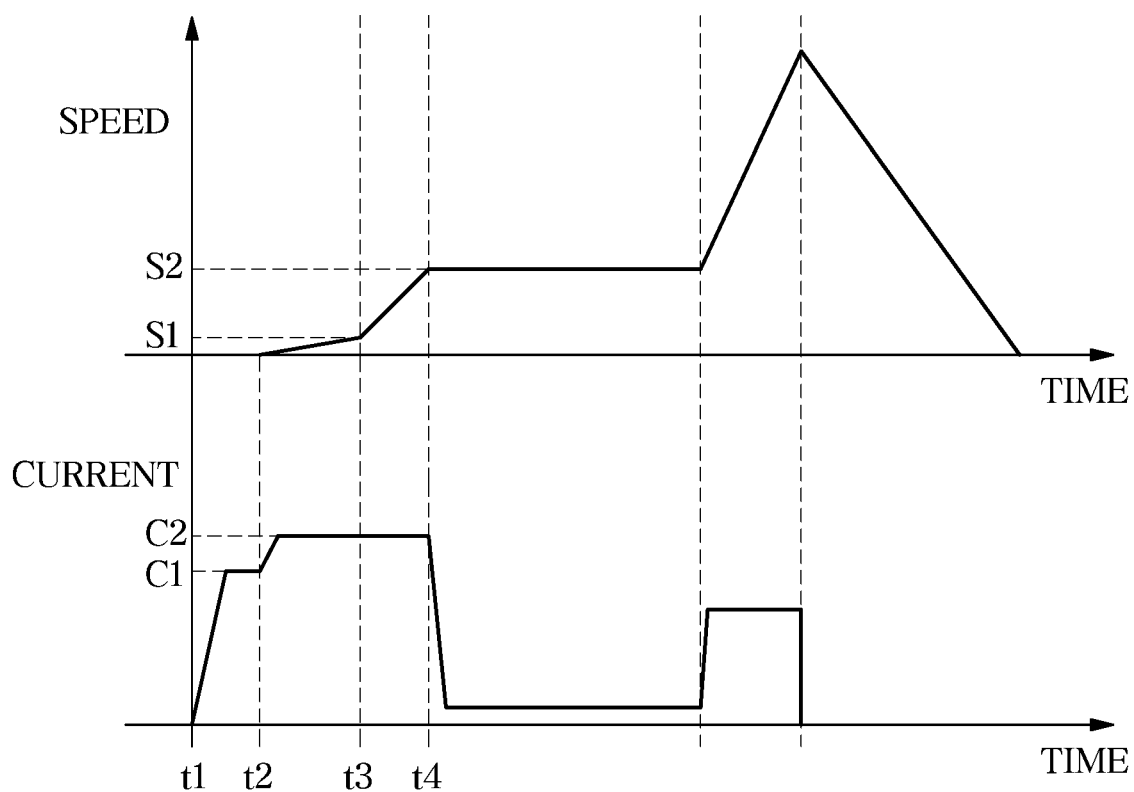
FIG. 10 illustrates a control graph of a motor when starting the motor provided in a washing machine according to an embodiment.

FIG. 9 is a flowchart illustrating a start control of a motor provided in a washing machine according to an embodiment, which will be described with reference to FIG. 10. Here, FIG. 10 illustrates a control graph of a motor when starting the motor provided in a washing machine according to an embodiment.

The washing machine controls the clutch 190 to the first operation mode when performing the washing stroke and the rinsing stroke, and controls the clutch 190 to the second operation mode when performing the dehydration stroke.

When the clutch 190 operates in the second operation mode as described above, the motor 180 is in a state of rotating only in one direction by the first bearing 197 of the clutch.

Because of this, it may not be possible to align the d-axis current to the stator to move the permanent magnet of the rotor to the nearest magnetic pole. That is, the closest magnetic pole during the alignment operation may be located on the left side or the right side of the permanent magnet.

In addition, when the clutch 190 operates in the second operation mode, shaking at start-up may be caused by the gap between the coupling gear 195a and the boss teeth 192c, and the coupling portion 195c of the coupling 195 and the dehydration shaft teeth 194b. At this time, the inertia of the motor suddenly increases, making it difficult to start the motor. That is, instability of the starting of the motor may occur.

Therefore, the washing machine according to the present embodiment accelerates the motor speed to the preset speed (that is, a first speed: S1) (302) when it is determined that the dehydration stroke is started and the starting point of the motor (301), and when it is determined that the speed of the motor is the first speed (303), the speed of the motor is accelerated (304) to the second speed faster than the preset speed.

The washing machine may rotate the motor by the first predetermined number when the motor accelerates to the first speed and rotate the motor by the second predetermined number when the motor accelerates from the first speed to the second speed.

In addition, when the motor accelerates to the first speed, the rotational speed of the motor may be about ⅕ of the rotational speed of the preset motor, and when the motor accelerates from the first speed to the second speed, the rotational speed of the motor may be approximately ⅘ of the preset rotational speed of the motor.

Next, when the washing machine determines that the speed of the motor is the second speed (305), the washing machine determines that the starting of the motor is completed (306), and performs a dehydration step while controlling the speed of the motor at the target speed for performing the dehydration step.

As such, when the clutch is in the second operation mode, the speed of the motor is increased stepwise when controlling the starting of the motor, thereby aligning the rotor during the starting control of the motor.

The preset speed may be a synchronous acceleration speed of less than 5 rpm as the first speed. In addition, the first speed may be ¹⁄₁₀ of the speed of the starting speed of the existing motor.

The second speed may be faster than 5 rpm and may be a synchronous acceleration speed of about 25 rpm.

In addition, the washing machine gradually increases the speed of the motor when the motor is started, so that the instability of motor starting due to the gap between the coupling gear 195a and the boss teeth 192c and the coupling portion 195c of the coupling 195 and the dehydration shaft teeth 194b can be eliminated.

In addition, the washing machine can reduce the starting failure rate of the motor by rotating the motor at the preset speed which is ¹⁄₁₀ of the speed of the existing motor when the motor starts.

The acceleration control up to the first speed of the motor and the control of the motor for the acceleration control up to the second speed will be described with reference to FIG. 10.

The washing machine increases the q-axis current controlling the torque component of the motor 180 from a first time t1 to a second time t2 to a first current C1 and the d-axis current controlling the magnetic flux component is kept to 0 [A]. At this time, the speed of the motor 180 is 0 [rpm] and keeps the stop state by a frictional time of the rotor 182 during a lag time between the magnetic field of the stator 181 and the magnetic field of the rotor 182. The washing machine accelerates the speed of the motor 180 to the first speed S1 from the second time t2 to a third time t3. At this time, the target speed is the first speed.

At this time, the washing machine increases the q-axis current for controlling the torque component of the motor 180 to a second current C2 [A] and maintains the q-axis current if the q-axis current is the second current (C2) [A], and keeps the d-axis current for controlling the magnetic flux component to 0 [A]. Therefore, the speed of the motor 180 may be accelerated to the first speed 51 [rpm].

If the speed of the motor 180 is the first speed S1, the washing machine accelerates the speed of the motor 180 to a second speed S2 from the third time t3 to a fourth time t4. At this time, the target speed is the second speed.

At this time, the washing machine maintains the q-axis current for controlling the torque component of the motor 180 as the second current C2 [A], and maintains the d-axis current for controlling the magnetic flux component to 0 [A]. As such, when the q-axis current is maintained at the second current C2 [A], the speed of the motor 180 may be accelerated to the second speed S2 [rpm].

Here, the second current C2 may be a starting current of the motor.

The current applied to the motor of the washing machine gradually decreases when the speed of the motor reaches the second speed S2.

And the washing machine controls the speed of the motor while controlling the current of the motor within the dehydration stroke within a rated current C2.

Figure 11:
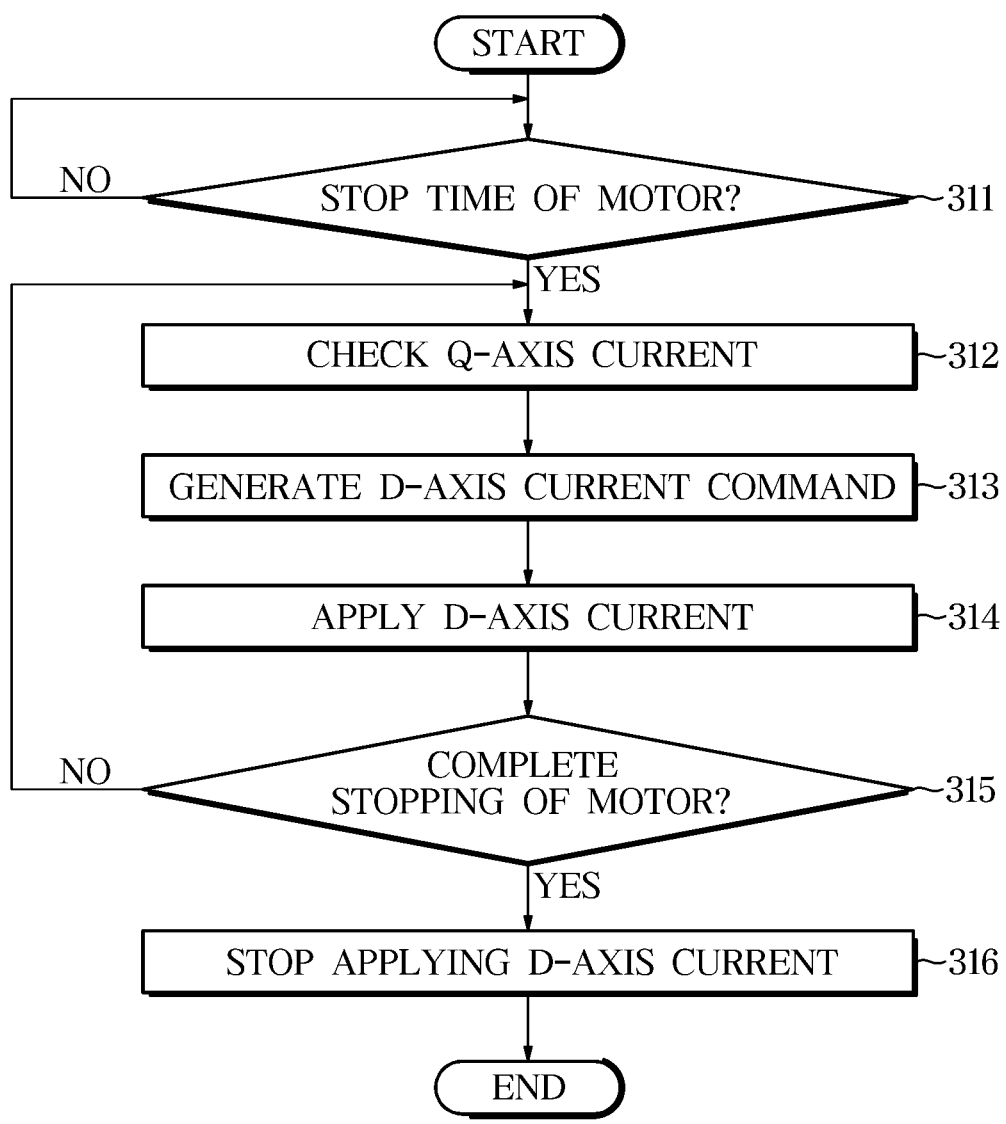
FIG. 11 is a flowchart illustrating a stop control of a motor provided in a washing machine according to an embodiment.
Figure 12:
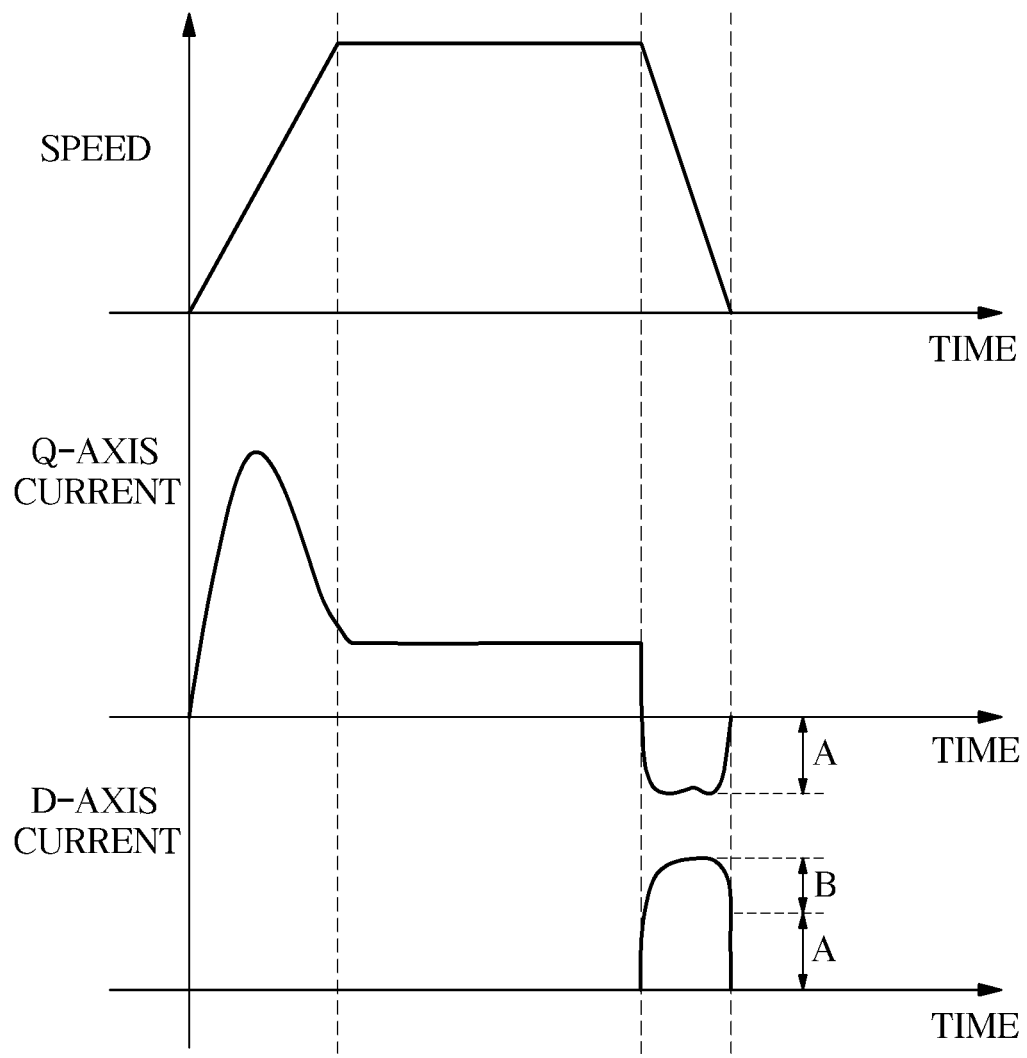
FIGS. 12 and 13 illustrate control graphs of a motor when the motor is stopped in a washing machine according to one embodiment.
Figure 13:
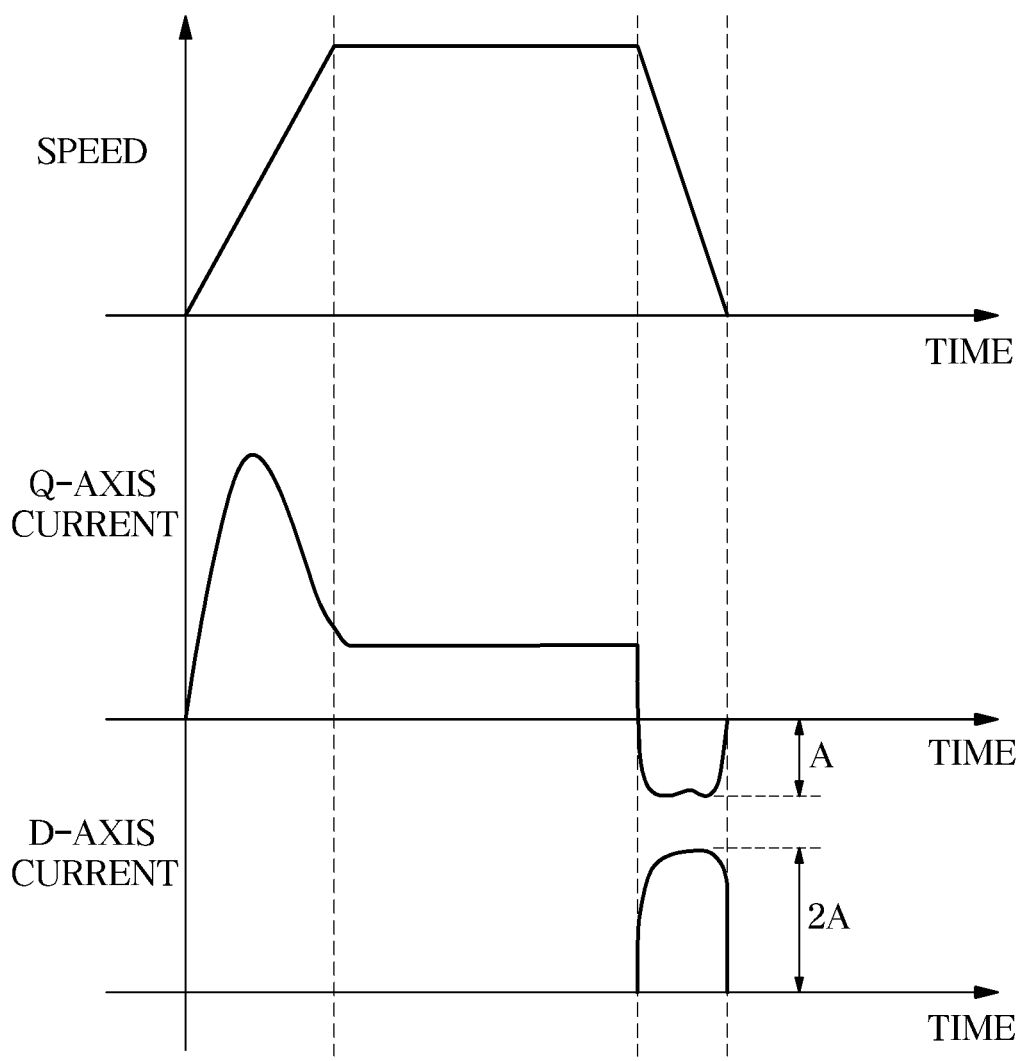

FIG. 11 is a flowchart illustrating a stop control of a motor provided in a washing machine according to an embodiment referring to FIGS. 12 and 13. FIGS. 12 and 13 illustrate control graphs of a motor when the motor is stopped in a washing machine according to one embodiment.

As shown in FIG. 11, the washing machine determines (311) whether the motor is stopped at the time of the washing, rinsing, and dehydrating strokes. Here, determining whether the stop point of the motor may include determining whether the stop command is input through the input.

When it is determined that the washing machine stops the motor, the washing machine checks the q-axis current (312) and generates a d-axis current command larger than the q-axis current (313).

That is, when the motor stops, the q-axis current controlling the torque component of the motor 180 decreases to a current A in the negative direction. At this time, torque is applied to the motor 180 in a direction opposite to the direction in which it is currently rotating.

Therefore, the motor 180 is reduced in rotational speed due to the torque acting in the direction opposite to the rotational direction, and the rotational speed is gradually reduced to stopping.

At this time, a counter electromotive force is detected in the stator 181 and the rotor 182 by the q-axis current flowing in the negative direction and the inertia, thereby increasing the value of DC input voltage Vcc of the smoother of the first driver.

This embodiment generates the d-axis current command larger than the q-axis current in order to prevent the DC link voltage of the smoother of the first driver from rising.

That is, the washing machine applies the d-axis current corresponding to the d-axis current command to the motor 180, and stops the application of the d-axis current when the motor stops (316).

As shown in FIG. 12, the washing machine can accelerate the speed of the motor by applying the q-axis current, and after the speed of the motor is accelerated, the speed of the motor can be controlled constantly while the q-axis current is kept constant.

When the washing machine determines that the motor stops (ts), it checks the q-axis current, generates the d-axis current larger than the identified q-axis current, and applies it to the motor.

For example, when the q-axis current is A, the d-axis current may be a current (A+B) larger by a certain magnitude (B) than A.

As shown in FIG. 13, when it is determined that the motor stops (ts), the washing machine may check the q-axis current, generate the d-axis current twice as large as the identified q-axis current, and apply it to the motor. That is, when the q-axis current is A, the d-axis current may be 2 A.

In this way, the d-axis current for controlling the magnetic flux component flows in the positive direction so that a back electromotive force energy generated in the inverter 254 can be consumed with less influence on the rotational speed of the motor. For this reason, even if the q-axis current is made to flow in the negative direction, it can prevent the DC link voltage of the smoother of the first driver from rising.

Therefore, the motor can be stopped while gradually reducing the rotational speed of the motor.

In addition, the washing machine may control the d-axis current when the washing machine is in the deceleration during the washing, rinsing, and dehydrating strokes.

As such, by suppressing the increase of the DC link voltage when the motor is decelerated or stopped, the motor can be stably controlled after the motor is decelerated or stopped.

As a result, the left and right stirring of the pulsator in the washing machine can be performed quickly, and the reliability of the washing machine can be ensured.

Although an embodiment has been described with a top loading washing machine provided with a clutch and a pulsator, it is also possible to control the starting, deceleration, and stopping of the motor in a front loading washing machine provided with a clutch and a pulsator.

Figure 14:
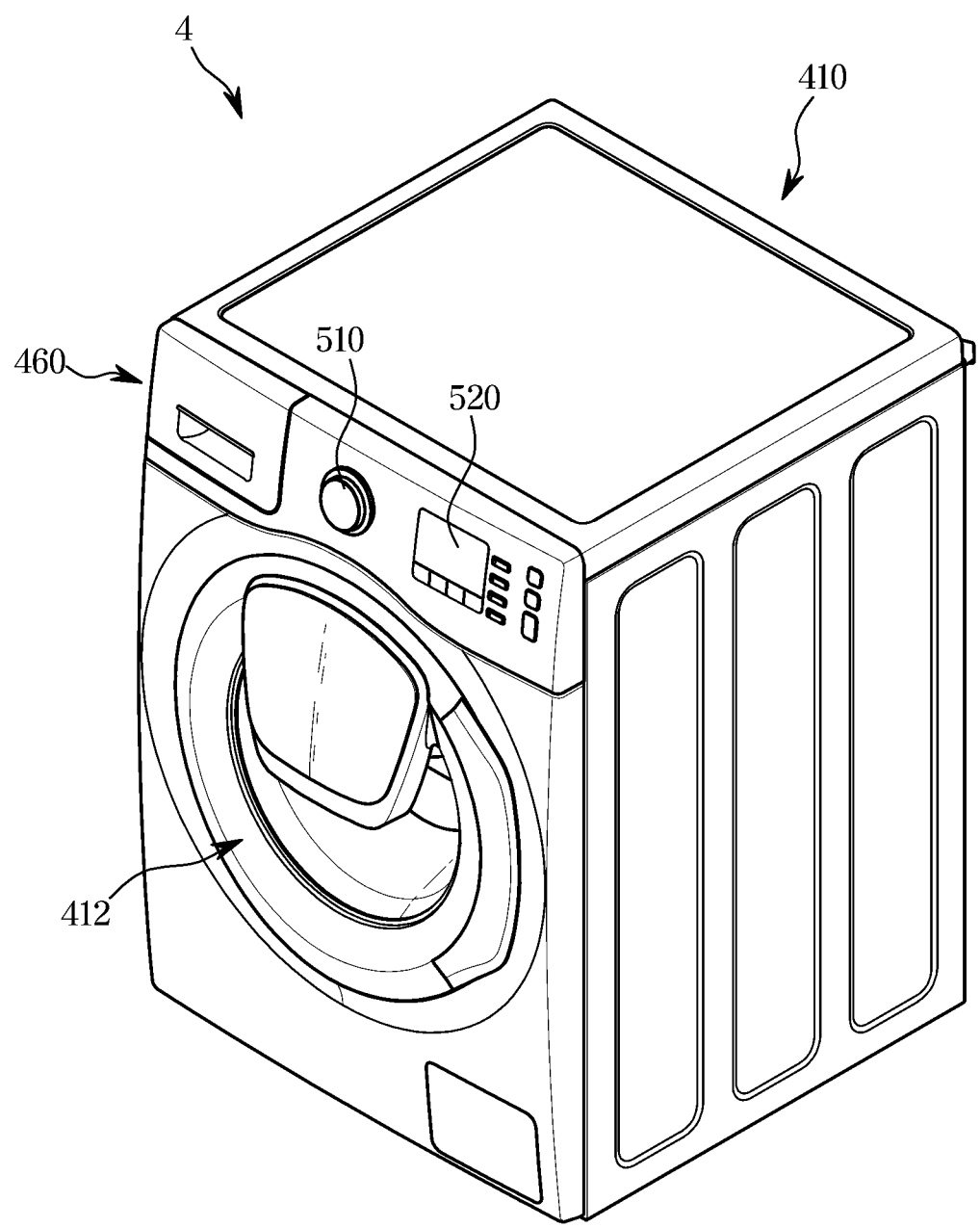
FIG. 14 illustrates a view of a washing machine according to an embodiment.
Figure 15:
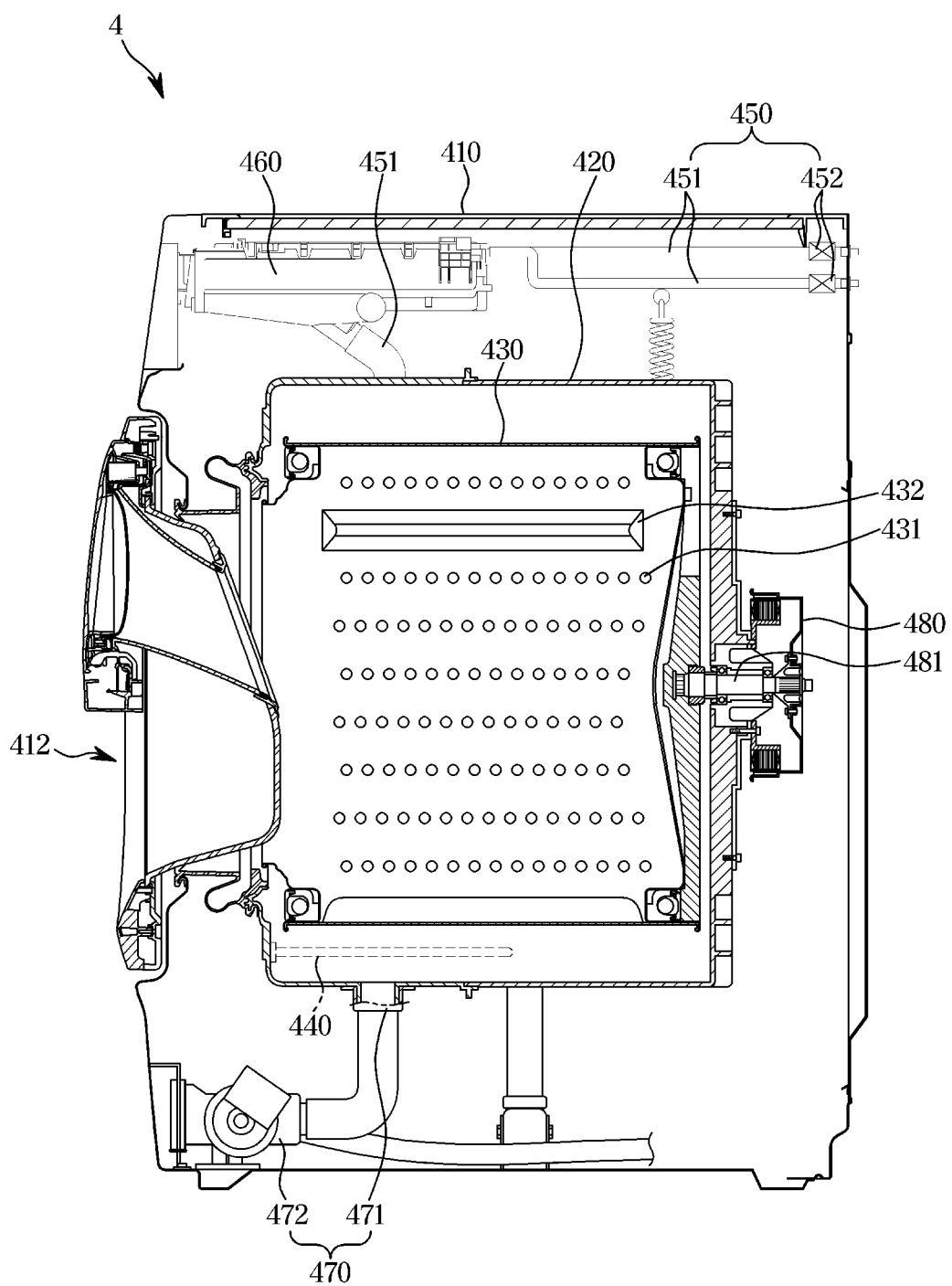
FIG. 15 illustrates a cross-sectional view of the washing machine illustrated in FIG. 14.

FIG. 14 illustrates a view of a washing machine according to an embodiment, and FIG. 15 illustrates a cross-sectional view of the washing machine shown in FIG. 14.

A washing machine 4 of an embodiment may be a washing machine of a front loading method in which laundry inlets are formed in front of a main body.

The washing machine 4 of an embodiment may also perform a drying stroke in addition to washing, rinsing and dehydrating strokes. In addition, an embodiment may be a dryer for performing a drying stroke.

As shown in FIG. 13, the washing machine 4 includes a cabinet 410, a water tank 420, a rotating tub 430, a heater 440, a water supplier 450, a detergent supplier 460, a drain 470 and a motor 480.

The cabinet 410 is to form the appearance of the washing machine 4, of which one side is formed with an inlet for loading and taking out laundry.

The cabinet 410 may be equipped with a door 412 for opening and closing the inlet, and a gasket for sealing between the door 412 and the inlet may be mounted on a circumferential surface of the inlet.

The water tank 420 is fixedly installed in the cabinet 410 and accommodates water supplied from the water supplier 450.

The outer side of the water tank 420 may be equipped with the motor 480 for rotating the rotating tub 430.

The rotating tub 430 is positioned inside the water tank 420 in a shape corresponding to that of the water tank 420. A rotation shaft 481 is mounted on the outside of the rotating tub 430, and the rotation shaft 481 may extend to the outside of the water tank 420 and be connected to the motor 480 mounted on the outside of the water tank 420. The rotation shaft 481 transmits a driving force of the motor 480 to the rotating tub 430.

Accordingly, the rotating tub 430 may be rotated clockwise or counterclockwise in the water tank 420 by the driving force of the motor 480.

An opening is formed in one surface of the rotating tub 430, and a plurality of holes 431 are formed in the other surface. The rotating tub 430 accommodates laundry through an opening when the door 412 is opened, and allows water to flow through the plurality of holes formed in the remaining surface.

That is, the plurality of holes 431 allow the water in the water tank 420 to flow into the rotating tub 430 and also discharge the water inside the rotating tub 430 to the water tank 420.

An inner circumferential surface of the rotating tub 430 may be provided with a plurality of lifters 432 to allow the laundry to rise and fall when the rotating tub 430 rotates.

The washing machine can wash the laundry using hot water.

In addition, the washing machine may further include the heater 440 provided in the water tank 420 for heating the water in the water tank 420. The heater (heating unit) 440 may include at least one heater.

The washing machine may further include a temperature detector for sensing the temperature of the heated water, and may control the operation of the heater based on the temperature of the water detected by the temperature detector.

The water supplier 450 includes a water supply pipe 451 and a water supply valve 452.

Here, one end of the water supply pipe 451 may be connected to an external water pipe, and the other end may be connected to the detergent supplier 460. The water supply pipe 451 receives water from the external water pipe and guides the detergent supplier 460.

The water supply pipe 451 may be connected between the detergent supplier 460 and the water tank 420. The water supply pipe 451 guides the water supplied from the external water pipe into the water tank 420 and the rotating tub 430 together with detergent of the detergent supplier 460.

The water supply valve 452 is opened and closed during the washing and rinsing stroke to adjust the amount of water supplied into the water tank 420 and the rotating tub 430.

The detergent supplier 460 stores the detergent added by the user. That is, the detergent supplier 460 may store at least one of a synthetic detergent, a fabric softener, and bleach.

The detergent supplier 460 when the water is inputted through the water supply pipe 451 during the washing stroke so that the inputted water is discharged to the water supply pipe 451 together with the detergent.

The drain 470 includes a drain pipe 471 and a drain pump 472. The drain pipe 471 may be provided below the water tank 420.

The drain pump 472 pumps water inside the water tank 420 and the rotating tub 430 during drainage and the dehydration stroke. That is, the drain pump 472 is introduced into the water tank 420 and the rotating tub 430 when the drain pump 482 is pumped along the drain pipe 471, and guides introduced water to the outside through the drain pipe 471 to discharge the water inside the rotating tub 430 to the outside.

The motor 480 is driven at the time of sensing the weight of the laundry, at the washing stroke, at the rinsing stroke, at the dehydration stroke, and at the drying stroke, and is accommodated in the rotating tub 430 by rotating the rotating tub 430 with the rotational force according to the driving, and allows the laundry to be washed, rinsed, dehydrated and dried.

The motor 480 may generate a rotational force from the power of an external power source, and transmit the rotational force to the rotating tub 430 through the rotation shaft 481. The motor 480 may employ a brushless direct current motor (BLDC motor) or a synchronous motor that can easily control the rotational speed. In addition, the motor 480 may employ a low-cost direct current motor (DC motor) or an induction motor (induction motor).

The washing machine may include an input 510 for receiving an operation command and a display 520 for displaying operation information of the washing machine.

The input 510 may include a plurality of buttons for receiving start, pause, and stop commands, and may further include a jog dial for receiving a laundry program. In addition, the input 510 for receiving the laundry program may be provided as a button type.

In addition, the input 510 may further include a button for receiving an option. The display 520 may display the operation information of the washing machine and display washing programs and options selected by the user.

The display 520 may display washing or non-washing, and may display a washing time when washing is not possible or an error code may be displayed.

The display 520 includes a plurality of seven segments.

The display 520 may include a flat panel display such as a liquid crystal display (LCD), and may further include a light emitting diode (LED).

Figure 16:
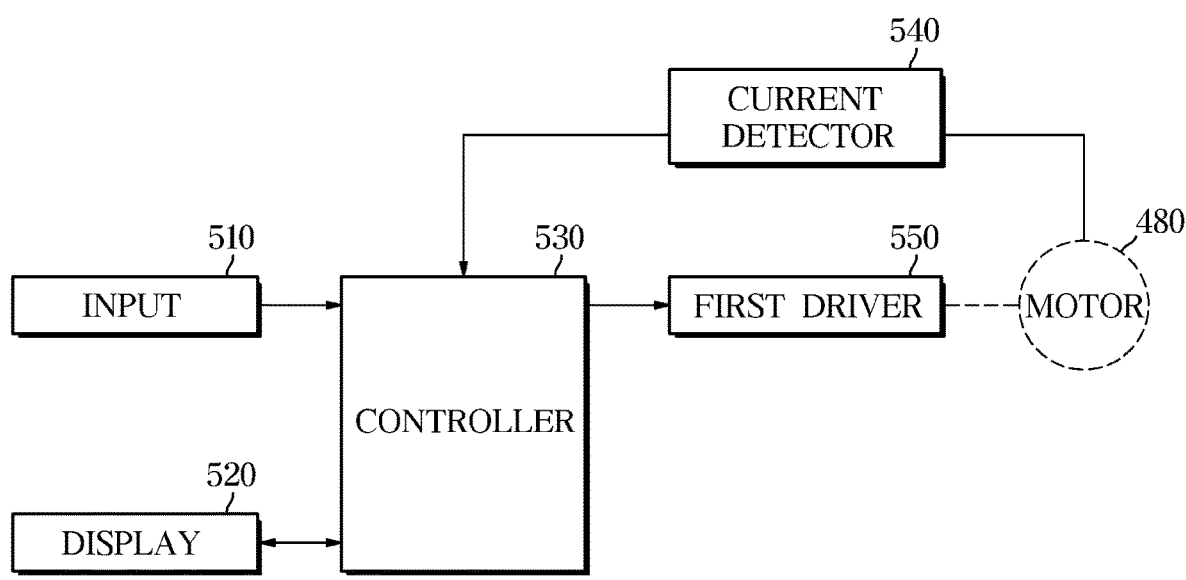
FIG. 16 illustrates a control block diagram of a washing machine according to an embodiment.

FIG. 16 illustrates a control block diagram of a washing machine according to an embodiment.

As shown in FIG. 16, the washing machine 4 includes the input 510, the display 520, a controller 530, a current detector 540, and a driver 550.

The input 510 receives an operation command from the user. The input 510 may include the plurality of buttons for receiving the start, pause, and stop commands, and may further include the button for receiving the laundry program. In addition, the input 510 may further include the button for receiving an option.

The display 520 displays information related to the state or operation of the washing machine 4, displays information input to the input 510, and displays information for guiding the user's input. The options may include at least one of the amount of water, the temperature of the water, the time of the washing stroke, the number of the rinsing strokes, the intensity of the dehydrating stroke and the time of the dehydrating stroke, and may include the dryness if the drying stroke is possible.

The controller 530 controls the overall operation of the washing machine 4. The controller 530 controls the operation of the washing machine based on the weight of the laundry, the washing program and the options input to the input 510.

The controller 530 controls the operation of the water supplier 450, the heater 440, and the drain 470 when controlling the operation of the washing machine, and controls the operation of the motor 580 to select the washing stroke, the rinsing stroke, a dewatering stroke and the drying stroke corresponding to the selected washing program and at least one option.

More specifically, the controller 530 checks the weight of the laundry corresponding to sensing information detected by a weight detector when the washing program is executed, and adjusts the water supply amount based on the checked laundry weight and the washing program selected by the user to control the washing stroke and the rinsing stroke, and controls the dehydration stroke based on the weight of the identified laundry and the washing program.

The controller 530 controls the operations of the water supplier 450, the motor 480, the heater 440, and the drain 470 during the washing stroke and the rinsing stroke control, and controls the motor 480 and the drain 470 during the dehydration stroke control, and controls the operation of the heater 440 and the motor 480 during the drying stroke.

That is, the controller 530 may control the heater 440 based on the temperature of the water selected during the washing stroke and the rinsing stroke control.

The controller 530 controls the operation of the display 520 to display the washing program selected by the user and at least one option.

The controller 530 increases the speed of the motor 480 stepwise when performing at least one of the washing stroke, the rinsing stroke, the dehydration stroke, and the drying stroke, and controls the starting of the motor 480.

More specifically, when the controller 530 controls the starting of the motor, the controller 530 accelerates and controls the speed of the motor to a preset speed. And when the speed of the motor is a preset speed (ie, the first speed), the motor speed is maintained and controlled for a predetermined time at the first speed for a predetermined time. And after a predetermined time elapses, the motor speed is controlled to a second speed faster than the preset speed. And when the speed of the motor is the second speed, it is determined that the start of the motor is completed and checks the target speed for performing at least one of the washing stroke, the rinsing stroke, the dehydration stroke, and the drying stroke and controls the motor speed to the identified target speed.

Here, the target speed may vary depending on an elapsed time of performing at least one of the washing stroke, the rinsing stroke, the dehydration stroke, and the drying stroke, and may vary according to the dehydration intensity of the dehydration stroke.

The preset speed may be less than 5 rpm at the first speed. The second speed may be 5 rpm or more, and may be five times the first speed.

The controller 530 may rotate the motor by a first predetermined number when the motor accelerates to the first speed and rotate the motor by a second predetermined number when the motor accelerates from the first speed to the second speed.

When the motor accelerates to the first speed, the rotational speed of the motor may be about $\frac{1}{5}$ of the rotational speed of the preset motor. When the motor accelerates from the first speed to the second speed, the rotational speed of the motor may be approximately $\frac{4}{5}$ of the preset rotational speed of the motor.

In addition, the controller 530 accelerates and controls the speed of the motor to the preset speed when controlling the starting of the motor, and when the speed of the motor is the preset speed (i.e., the first speed), the speed of the motor is accelerated and controlled to the second speed, which is faster than the preset speed, and when it is determined that the speed of the motor is the second speed, it is possible to determine that the starting of the motor is completed.

In addition, when controlling the starting of the motor, the controller 530 accelerates and controls the speed of the motor up to the preset speed. The speed is controlled to accelerate to the second speed, which is faster than the preset speed, and when it is determined that the speed of the motor is the second speed, it is possible to determine that the starting of the motor is completed.

As such, the controller 530 may increase the speed of the motor stepwise when controlling the starting of the motor, thereby omitting alignment of the rotor during the starting control of the motor.

The controller 530 may reduce a failure rate of the motor by rotating the motor at the first speed that is $\frac{1}{10}$ of the speed of the existing motor when the motor is started.

The controller 530 receives a current supplied to the motor 480 detected by the current detector 540, and controls the speed of the motor 480 to stop by a regular deceleration control operation based on a comparison result between the detected current and the target current.

That is, the controller 530 controls the driver 550 to supply the current to the motor 480 to generate a rotational force, thereby performing the washing, rinsing, and dehydrating strokes, and reducing the speed of the motor during each of the strokes, When each of the strokes is completed, the motor 480 may be stopped.

In addition, when the stop command is input from the user even during the washing, rinsing, and dehydration strokes, the controller 530 may control the driver to stop the motor 480.

In other words, the controller 530 may control the driver unit to operate, decelerate, or stop the motor 480 according to the input operation command, administration performance information, and the like.

The controller 530 reduces the target speed during the deceleration or stop control of the motor during the washing, rinsing, and dehydrating stroke and controls a current of a magnetic flux component (d-axis current), which is larger than a torque component current (q-axis current) to be applied to the motor.

As such, by suppressing an increase in DC link voltage of an expanded part of the driver 550 when the motor is decelerated or stopped, the motor can be stably controlled after the motor is decelerated or stopped.

In addition, the controller 530 may apply the current of the magnetic flux component (d-axis current) greater than the torque component current (q-axis current) applied to the motor even when controlling the deceleration and stopping of the motor when the weight of the laundry is sensed.

The current detector 540 detects the current applied to the motor 480 and transmits information corresponding to the detected current to the controller 530.

The driver 550 drives the motor 480 based on the control command of the controller 530. The driver 550 may include an inverter.

That is, the driver 550 may include the inverter for generating a driving current of the motor according to the control command of the controller 530 so that the motor 480 generates the driving force. The detailed configuration of the controller 530 and the driver 550 is the same as in a prior embodiment, and the description thereof will be omitted.

In the starting control order of the motor and the deceleration or stop control order of the motor provided in the washing machine according to an embodiment of the present disclosure, There is no configuration to control the operation mode of the clutch, other configurations of controlling the motor are the same as in the embodiment and therefore the description thereof is omitted.

In addition, an embodiment has been described with respect to the drum washing machine, and it is also possible to implement the start, deceleration and stop control of the motor in a dryer.

On the other hand, the disclosed embodiments may be implemented in the form of a recording medium for storing instructions executable by a computer. Instructions may be stored in the form of a program code, and when executed by a processor, may generate a program module to perform the operations of the disclosed embodiments. The recording medium may be implemented as a computer-readable recording medium.

The computer-readable recording medium includes all kinds of recording media having stored thereon instructions which can be read by a computer. For example, there may be read only memory (ROM), random access memory (RAM), a magnetic tape, a magnetic disk, a flash memory, an optical data storage device, and the like.

Although the present disclosure has been described with various embodiments, various changes and modifications may be suggested to one skilled in the art. It is intended that the present disclosure encompass such changes and modifications as fall within the scope of the appended claims.

What is claimed is:
1. A washing machine, comprising:
a rotating tub;
a motor configured to apply a driving force to the rotating tub, the motor being a sensorless type motor;

a controller, while starting the motor without an alignment operation, configured to:
control generation of a starting current applied to the motor, and
control a speed of the motor to increase stepwise while the starting current is applied to the motor; and
a driver configured to:
generate a current for driving the motor in response to a control command of the controller, and
apply the generated current to the motor.

2. The washing machine of claim 1, wherein the controller, while controlling the speed of the motor to increase stepwise, is further configured to:
control a synchronous acceleration of the speed of the motor to a first speed; and
control the synchronous acceleration of the speed of the motor to a second speed after the speed of the motor reaches the first speed, the second speed being faster than the first speed.

3. The washing machine of claim 2, wherein the controller is further configured to control the motor to rotate at a higher rate when the motor is accelerated during the synchronous acceleration in the second speed than when the motor is accelerated during the synchronous acceleration in the first speed.

4. The washing machine of claim 1, further comprising:
a pulsator rotatably provided in the rotating tub; and
a clutch configured to transmit the driving force of the motor to at least one of the pulsator or the rotating tub,
wherein the controller is further configured to accelerate the speed of the motor to increase stepwise to start the motor while the driving force of the motor is transmitted to the rotating tub by the clutch.

5. The washing machine of claim 4, further comprising:
a dehydration shaft connected to the rotating tub; and
a bearing provided in the clutch, the bearing configured to guide the dehydration shaft to rotate in one direction,
wherein the controller is further configured to accelerate the speed of the motor to increase stepwise at a rotation timepoint of the rotating tub to start the motor.

6. The washing machine of claim 4, further comprising:
a driving shaft connected to the motor;
a washing shaft connected to the pulsator;
a boss provided in the clutch, the boss coupled to the driving shaft; and
a coupling provided in the clutch, the coupling selectively coupled to the boss and the washing shaft,
wherein, at a time of rotation of the rotating tub, the coupling couples to:
boss teeth with a gap having a first predetermined size, and
dehydration teeth provided in a dehydration shaft with a gap having a second predetermined size.

7. The washing machine of claim 1, wherein the driver comprises:
a rectifier configured to rectify AC power inputted from a power supply;
a smoother configured to smooth power transmitted from the rectifier, the smoother configured to convert the power transmitted into constant size DC power; and
an inverter configured to convert transmitted DC power from the smoother into 3-phase AC power.

8. The washing machine of claim 7, wherein the controller is further configured to:
determine whether to decelerate the motor when performing any of a washing stroke, a rinsing stroke, a dehydration stroke, and a drying stroke, and
in response to a deceleration time point being determined,
check a current of a torque component to prevent a rise of DC voltage of the smoother, and
apply a current of a magnetic flux component greater than a magnitude of the checked current of the torque component to the motor.

9. The washing machine of claim 7, wherein the controller is further configured to:
determine whether to stop the motor while performing any of a washing stroke, a rinsing stroke, a dehydration stroke, and a drying stroke, and
in response to a stop time point being determined,
check a current of a torque component to prevent a rise of DC voltage of the smoother, and
apply a current of a magnetic flux component greater than a magnitude of the checked current of the torque component to the motor.

10. The washing machine of claim 7, further comprising an input,
wherein the controller is configured to:
check a current of a torque component to prevent a rise of DC voltage of the smoother in response to a stop command being received from the input, and
apply a current of a magnetic flux component greater than a magnitude of the checked current of the torque component to the motor.

11. The washing machine of claim 7, wherein the controller is further configured to:
determine whether the motor stops, and
in response to determining that the motor is stopped,
check the speed of the motor,
in response to the speed of the motor being higher than a reference speed, check a current of a torque component to prevent a rise of DC voltage of the smoother, and
control a current of a magnetic flux component greater than a magnitude of the checked current of the torque component to be applied to the motor.

* * * * *